US009902569B2

(12) United States Patent
Lykkegaard

(10) Patent No.: US 9,902,569 B2
(45) Date of Patent: Feb. 27, 2018

(54) SORTING SYSTEM HAVING COVER PLATES CLOSING GAPS BETWEEN SUPPORT STRUCTURES

(71) Applicant: BEUMER Group A/S, Aarhus N (DK)

(72) Inventor: Uffe Lykkegaard, Aarhus C (DK)

(73) Assignee: BEUMER Group A/S, Aarhus N (DK)

( * ) Notice: Subject to any disclaimer, the term of this patent is extended or adjusted under 35 U.S.C. 154(b) by 0 days.

(21) Appl. No.: 15/312,691

(22) PCT Filed: May 22, 2015

(86) PCT No.: PCT/DK2015/050126
§ 371 (c)(1),
(2) Date: Nov. 21, 2016

(87) PCT Pub. No.: WO2015/176728
PCT Pub. Date: Nov. 26, 2015

(65) Prior Publication Data
US 2017/0183167 A1 Jun. 29, 2017

(30) Foreign Application Priority Data
May 22, 2014 (DK) .................................. 2014 70298

(51) Int. Cl.
*B65G 47/46* (2006.01)
*B65G 47/96* (2006.01)
(Continued)

(52) U.S. Cl.
CPC ......... *B65G 47/962* (2013.01); *B65G 17/066* (2013.01)

(58) Field of Classification Search
CPC .............................. B65G 47/38; B65G 47/962
(Continued)

(56) References Cited

U.S. PATENT DOCUMENTS 5,667,054 A * 9/1997 van den Goor ...... B65G 17/066
198/370.04
6,135,262 A 10/2000 Polling
(Continued)

FOREIGN PATENT DOCUMENTS

EP 0 753 474 A1 1/1997
EP 0 994 048 A1 4/2000
(Continued)

OTHER PUBLICATIONS

International Search Report issued in related PCT/DK2015/050126 dated Aug. 6, 2015.
(Continued)

*Primary Examiner* — James R Bidwell
(74) *Attorney, Agent, or Firm* — Woodard, Emhardt, Moriarty, McNett & Henry LLP

(57) ABSTRACT

The invention relates to a sorting system of the support structure type, which includes known sorting systems such as tray type sorting systems. They include a track along which carts and support structures are conveyed. Cover plates are arranged to close gaps between the support structures, also when the support structures are conveyed through curved sections, so that conveyed items are prevented from falling through the gaps. The invention further involves a gap closing kit for a support structure sorting system. The invention also involves a method of providing a support structure sorting system having a gap substantially closed between at least two support structures. The cover plates are connected to the support structures by leading systems as well as connected to guiding systems, which guiding systems have one part fixated to an adjacent cart. The support structures, the guiding systems and the leading systems are configured to control movement of the cover plates relative to the support structures in order to close a gap between adjacent support structures, when conveyed in
(Continued)

sections of a track, which track may have only horizontal straight and curved sections, or include inclined or declined straight or curved sections.

30 Claims, 32 Drawing Sheets

(51) Int. Cl.
*B65G 17/06* (2006.01)
*B65G 47/10* (2006.01)

(58) Field of Classification Search
USPC .................................................. 198/370.04
See application file for complete search history.

(56) References Cited

U.S. PATENT DOCUMENTS

| | | |
|---|---|---|
| 6,360,868 B1 | 3/2002 | Arlt et al. |
| 6,607,066 B1 | 8/2003 | Andersen et al. |
| 7,337,892 B2 * | 3/2008 | Groot .................. B65G 17/066 198/369.3 |
| 7,431,162 B2 | 10/2008 | Forsyth |
| 7,431,164 B2 | 10/2008 | Groot et al. |
| 9,656,810 B1 * | 5/2017 | Layne ................ B65G 21/2072 |

FOREIGN PATENT DOCUMENTS

| | | |
|---|---|---|
| EP | 1 196 341 A1 | 3/2004 |
| EP | 1 447 359 A2 | 8/2004 |
| EP | 1 602 604 A1 | 12/2005 |
| EP | 2 305 582 A1 | 4/2011 |
| WO | WO 97/13712 | 4/1997 |
| WO | WO 99/33719 | 7/1999 |
| WO | WO 00/02802 | 1/2000 |
| WO | WO 00/71446 A1 | 11/2000 |

OTHER PUBLICATIONS

Written Opinion issued in related PCT/DK2015/050126 dated Aug. 6, 2015.

* cited by examiner

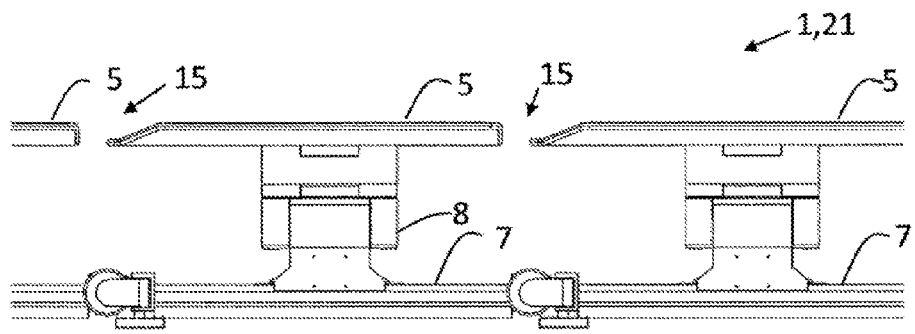
Figure 1 (Known art)
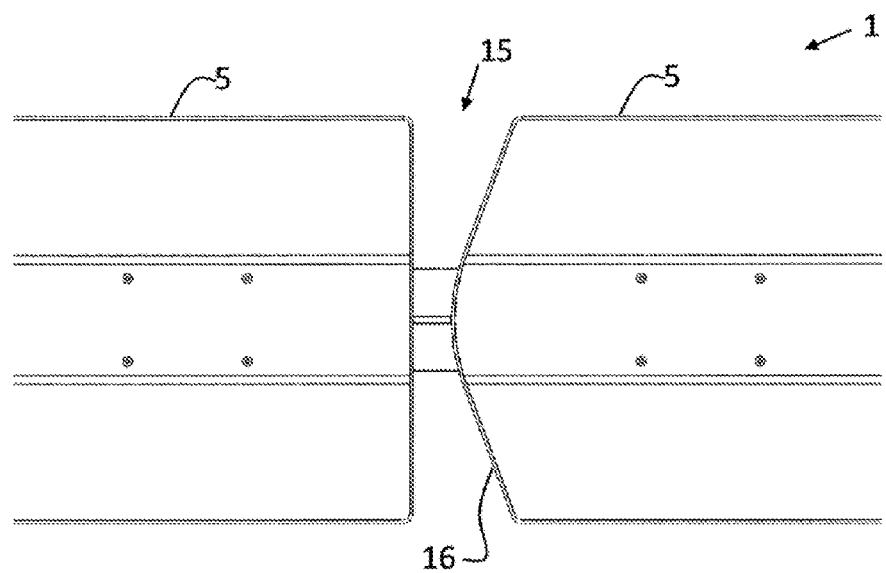
Figure 2 (Known art)

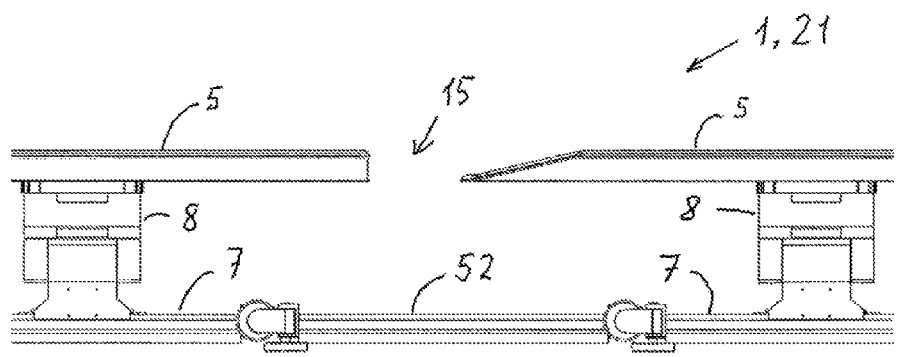
Figure 3 (Known art)
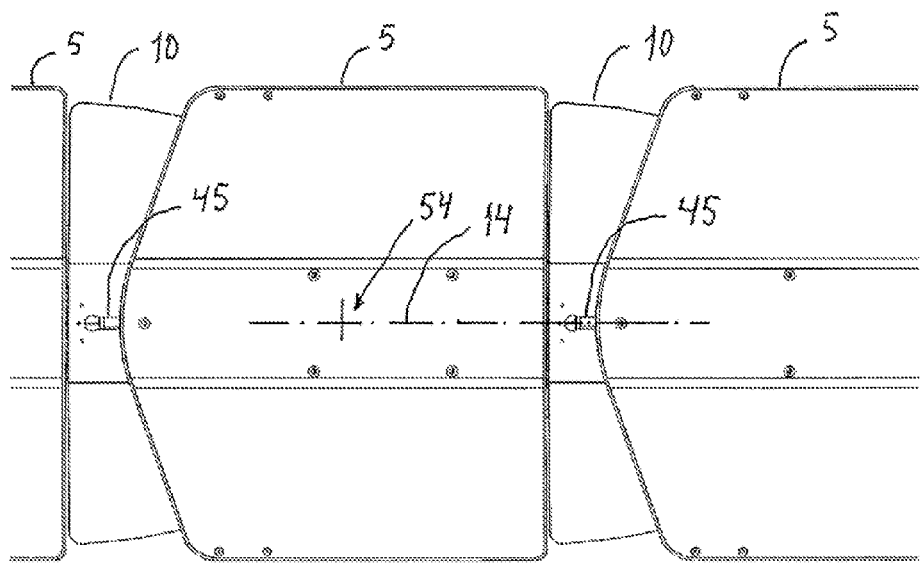
Figure 4

SORTING SYSTEM HAVING COVER PLATES CLOSING GAPS BETWEEN SUPPORT STRUCTURES

TECHNICAL FIELD

The invention relates to a sorting system of the conveyed support structure type, some of which systems are known as tray sorting systems, e.g. tilt-tray sorting systems. They include a track along which carts with support structures are conveyed. Cover plates are arranged to close gaps between the support structures, also when the support structures are conveyed through curved sections, so that conveyed items are prevented from falling through the gaps. The invention further involves a gap closing kit for a support structure sorting system. The invention also involves a method of providing a support structure sorting system having a gap substantially closed between at least two support structures.

BACKGROUND

Support structures for tilt support structure sorters have a shape or distance between them, which results in a gap between adjacent support structures. Otherwise the support structures cannot be conveyed through a curved section. Such curved sections may have a radius of 2 meters. The gap may not always be an issue, but in particular, when conveying items of a relatively small size, there is a risk, that an item may fall through a gap and potentially also cause a stop in the operation of the sorter.

One known attempt to solve the issue is shown in U.S. Pat. No. 7,431,164 B2, Groot et al. In FIG. 3 of the US patent is shown carts 2, support structures 7, cover plates 12, pins 8 and springs 23. The support structures 7 guide the cover plates 12, which are urged against an adjacent support structure by a force provided by the spring. Such a system will over time be requiring regular maintenance, as an example, when the springs become worn. Also, the continued tensioning of the springs will add a cost for additional energy to operate the sorting system.

It is an object of the present invention to provide an alternative to the known art. Another object is to provide an improved sorting system. Further objectives appear from the description, claims and figures.

SUMMARY

One aspect of the invention involves a sorting system comprising
  a track having horizontally straight sections and horizontally curved sections,
  a plurality of non-tiltable or tiltable load support structures, a plurality of linked conveying carts adapted to support and convey the support structures along the track in a conveying direction,
  a cover plate arranged with a support structure so as to substantially close a gap between the support structure and an adjacent support structure,
where the sorting system comprises a leading system configured to
  connect the cover plate to the support structure, for the support structure to carry the cover plate and any item located at least partly on the cover plate,
  and allow rotation of the cover plate relative to the support structure about an axis, which axis is vertical, when the cover plate is untilted and in a horizontal section of the track,
  and allow motion of the cover plate relative to the support structure back and forth in the conveying direction,
  and substantially center the cover plate relative to the adjacent support structure, when the cover plate and the adjacent support structure are in a horizontal straight section of the track,
where the sorting system comprises a guiding system comprising a first and a second part,
  where one part of the first and second parts is connected to the cover plate,
  and the other part of the first and second parts is fixated directly or indirectly to an adjacent cart, which adjacent cart is located in a direction, in which direction the cover plate and the adjacent support structure are located, and wherein fixated indirectly includes that the other part of the first and second parts of the guiding system is fixated to any element located on the adjacent cart, including to a non-tilting support structure, a support for a non-tilting support structure, a tilting mechanism or a tiltable support structure,
  and where the first and second parts of the guiding system constrain the cover plate from moving back and forth in the conveying direction,
  and where the first and second parts of the guiding system are movably arranged relative to each other in a plane, which plane is vertical and transverse to the conveying direction, when the cover plate is in a horizontal straight section of the track,
and wherein the motion of the cover plate is led and guided by the leading system and the guiding system, in order to substantially close a gap between the support structure and an adjacent support structure with the cover plate during operation of the sorting system.

It is hereby provided, that a gap between two adjacent support structures is closed. There may be a plurality of adjacent support structures, where the gaps between them are closed in a same manner. Closing of the gap is obtained in short by having the cover plate arranged between an associated support structure and an adjacent support structure. The cover plate is located by the adjacent support structure at all times, but moves relative to its associated support structure. The cover plate may move sideways and up or down as well as tilt, but still be located with the adjacent support structure. The cover plate associated with the support structure may relatively move back and forth as well as rotate, such as in curves, as well as whether or not the cover plate associated with the support structure is tilted or untilted. The gap hereby remains closed or substantially closed. The support structures may be plane or non-plane.

The guiding system, as having the other part of the first and second parts fixated directly or indirectly to an adjacent cart, which adjacent cart is located in a direction, in which direction the cover plate and the adjacent support structure are located, and wherein fixated indirectly includes that the other part of the first and second parts of the guiding system is fixated to any element located on the adjacent cart, including to a non-tilting support structure, a support for a non-tilting support structure, a tilting mechanism or a tiltable support structure, controls the position in the conveying direction of the cover plate, so that it remains located with the adjacent support structure to close the gap. The allowed movements and the constraint provided by the guiding system and leading system enables the cover plate to tilt or not tilt with the support structure and allows movement of the cover plate. The leading system provides allowed movements of the cover plate relative to the support structure.

Also, the leading system connected to the support structure carries the cover plate and any item at least partly laying on the cover plate.

Moreover, the sorting system may be of a tiltable support structure type, which comprises a plurality of linked conveying carts adapted to support and convey the support structures along the track in a conveying direction as well as tilt the support structures, where the sorting system comprises a leading system configured to connect the cover plate to the support structure, for the support structure and the associated cover plate to be tilted together.

Examples of sorting systems with non-tiltable load support structures include so-called cross-belt sorters and sorters comprising a plane or non-plane support surface, from which surface the load is pushed off by one or more pushing elements, when an item is to be discharged.

The guiding system may in one embodiment involve, that one part is connected to the cover plate by being an integrated part of the cover plate. The one part may be an integrated part of the cover plate, e.g. by being cast in one piece. Also, if the cover plate is cut from a plate, this may involve that the one part is included and after cutting is bent into shape.

In the guiding system, where one part of the first and second parts is connected to the cover plate, the connection may be located next to the adjacent support structure, but may also be located closer to the support structure, which is carrying the cover plate. By closer is meant one to five centimeters relative to the conveying direction.

The connection may be of a fixated kind, if the track is purely horizontal and the support structures and cover plate are untilted in curves. Or of a bendable kind, so as to allow the cover plate to bend relative to the guiding system. This is in order to allow, by bending of the connection, the cover plate to bend as a whole relative to the guiding system about an axis, which is horizontal and transverse to the conveying direction, when the cover plate is untilted in a horizontal straight section of the track. Hereby, the support structure and the cover plate may be conveyed in inclined and declined straight sections and/or inclined and declined curved sections, including transitions between such sections of the track, while the support structures and cover plates are tilted or untilted. A bendable connection may be obtained by inserting at least one deformable element, such as an elastomeric element between the one non-fixated part of the guiding system and the cover plate. A similar effect may be obtained by arranging one part of the first and second parts of the guiding system to be pivotably connected by at least one hinge to the cover plate in order to allow rotation of the cover plate as a whole about an axis, which axis is horizontal and transverse to the conveying direction, when the cover plate is untilted and in a horizontal straight section of the track.

By tilting, e.g. inwardly in curves, a higher conveying speed with conveyed items may be obtained. Also, tilting in curves makes it possible to have discharge stations located next to an outlet of a curve and before an inlet of a curve.

The sorting system may involve, that the first and second parts of the guiding system are engaged with each other to constrain the cover plate from moving back and forth in the conveying direction, and wherein one of the parts extends so widely in plane, which plane is vertical and transverse to the conveying direction, when the cover plate is in a horizontal straight section of the track, that the other part may move and rotate relative to the one part in that plane. The engagement is in order to constrain the cover plate from moving back and forth in the conveying direction. It is also constraining the first part and second part from rotating or twisting about an axis in a plane, which plane is vertical and transverse to the conveying direction, when the cover plate is in a horizontal straight section of the track.

The support structure and the cover plate may be conveyed in sections of a track having sections selected from a group comprising inclined straights sections, declined straight sections, inclined curved sections and declined curved sections, including transitions between such sections of the track, while the support structures and cover plates are tilted or untilted. This means that the sorting system according to the invention may enable conveying of both non-tiltable and tiltable support structures, also e.g. known as plates, trays or tilt trays, in the described sections of the track.

The track may be horizontal and have straight and curved sections, and wherein one part of the first and second parts of the guiding system is fixated to the cover plate and the other part is fixated directly or indirectly to an adjacent cart, and where the support structures are untilted at least in curved sections. In this way the guiding system becomes simpler, when the track is horizontal, because one part of the first and second parts of the guiding system is fixated to the cover plate.

One embodiment of the guiding system may comprise a first part having two parallel plates and a second part being an upright, which has a thickness corresponding to a distance between the two plates.

Another embodiment of the guiding system may comprise a first part having two uprights, each having one plane side, and a second part being a plate with a cut-out, where a pin through the cut-out from the upright is connected to the other upright, where the plane sides of the uprights are facing each other and have a distance between them corresponding to a wall thickness of the plate.

Both embodiments of the guiding system may in this way be manufactured in a simple and low cost manner.

The leading system may comprise a leading element providing a recess adapted for supporting and leading the cover plate underneath the support structure. The recess may be in the leading element, or between the leading element and the support structure, or be included in the support structure, such as a milled recess. Also, the leading system may comprise two or more leading elements arranged, relative to the conveying direction, at opposite sides of the support structure.

Moreover, a holding element may provide a recess adapted for supporting and leading the cover plate underneath the support structure.

The cover plate may preferably be made of a polymeric material, including made of polypropylene (PP), which has a low coefficient of friction, when moved relative to an object of another material. Polypropylene is a low cost material.

The leading system may comprise a leading element, which may be made of a polymeric material, including made of polyoxymethylene (POM). Also this material has a low coefficient of friction, when moved relative to an object of another material. Moreover, this material has a relatively high stiffness, whereby it is convenient to use, when low deformation is required. Furthermore, the holding element may be made of a polymeric material, including made of polyoxymethylene (POM).

The support structure may be concave in a direction, which direction is horizontal and transverse to the conveying direction, when the support structure is conveyed untilted in a horizontal straight section of the track. With a concave support structure, items conveyed on the support structure are more securely stored during conveying.

The leading system may comprise a leading element and/or holding element, which provides a recess adapted for supporting and leading the cover plate underneath the support structure and is shaped according to the concave support structure. In order for the cover plate to fit into the recess of the leading element, the cover plate may be bent to fit into the recess and to fit the shape of the support structure. This is a simple and relatively cost efficient solution. Otherwise the cover plate may be pre-bent or cast to fit the recess. In that case, it is also possible to use the holding element alone to support the cover plate.

The cover plate may have a longitudinal hole, which is parallel to the conveying direction. Also, the longitudinal hole in the cover plate may be in line with a center part of the adjacent support structure. The longitudinal hole is associated with the leading system as explained below.

The leading system may involve, that the cover plate is connected movably to the support structure by a holding element placed underneath the support structure and in contact with the cover plate, where the holding element is connected to the support structure by a fastening element, e.g. trough the longitudinal hole, and where the holding element has a dimension larger than the width of the longitudinal hole. The contact of the holding element with the cover plate may be unstrained to allow a distance between the cover plate and the underside of the support structure of three to seven millimeters.

The leading system may comprise leading elements and that a leading pin is connected to the support structure and is extending from the support structure through the longitudinal hole, and where the leading pin has a width corresponding to a width of the longitudinal hole.

An embodiment of the sorting system may involve, that a first support structure is connected with a first cover plate, which is led and guided by a leading system and a guiding system, and is extending towards an adjacent second support structure, where a second adjacent support structure is connected to a second cover plate, which is led and guided by a leading system and a guiding system, and is extending towards the first cover plate of the first support structure, in order to substantially close a gap between the support structure and an adjacent support structure with the cover plate during operation of the sorting system. This is useful, when a gap between two support structures is of a magnitude, where it is less complicated to close the gap with two cover plates rather than one.

A further aspect of the invention relates to a gap closing kit for a sorting system, the kit comprising:
  a cover plate,
  a leading system adapted to, when installed on a sorting system,
    connect the cover plate to a tiltable or non-tiltable support structure, and for the support structure to carry the cover plate and any item located at least partly on the cover plate,
    and allow rotation of the cover plate relative to the support structure about an axis, which is vertical, when the cover plate is untilted, and in a horizontal straight section of the track,
    and allow motion of the cover plate relative to the support structure back and forth in the conveying direction,
    and substantially center the cover plate relative to an adjacent support structure of the sorting system, when the cover plate and adjacent support structure are untilted and are in a horizontal straight section of a track of the sorting system,
  a guiding system, which when installed on a sorting system, comprises:
    a first and a second part,
    where one part of the first and second parts is connected to the cover plate,
    and the other part of the first and second parts is fixated directly or indirectly to an adjacent cart, which adjacent cart is located in a direction, in which direction the cover plate and the adjacent support structure are located, and wherein fixated indirectly includes that the other part of the first and second parts of the guiding system is fixated to any element located on the adjacent cart, including to a non-tilting support structure, a support for a non-tilting support structure, a tilting mechanism or a tiltable support structure.
    and where the first and second parts of the guiding system constrain the cover plate from moving back and forth in the conveying direction,
    and where the first and second parts of the guiding system are movably arranged relative to each other in a plane, which plane is vertical transverse to the conveying direction, when the cover plate is in a horizontal straight section of the track,
in order to substantially close a gap between the support structure and an adjacent support structure with the cover plate during operation of the sorting system. Such a kit is useful for retrofitting on existing support structure sorting systems in order to close the gaps between adjacent support structures. The support structures may be tiltable or non-tiltable. The support structures may be plane or non-plane.

The kit may involve a guiding system, where one part of the first and second parts of the guiding system, which when installed, is pivotably connected or bendably connected to the cover plate in order to allow rotation or bending of the cover plate as a whole about an axis, which axis is horizontal and transverse to the conveying direction, when the cover plate is untilted and in a straight horizontal section of the track. A guiding system configured in this way, may allow supporting structures to be tilted in curves.

The kit may involve, when installed on a tilt support structure sorting system, that a first support structure is connected with a first cover plate, which is led and guided by a leading system and a guiding system, and is extending towards an adjacent second support structure, where the second adjacent support structure is connected to a second cover plate, which is led and guided by a leading system and a guiding system, and is extending towards the first cover plate of the first support structure, in order to substantially close a gap between the support structure and an adjacent support structure with the cover plates during operation of the sorting system. In this way, the kit may cover a relatively large gap between the support structures.

Another aspect of the invention relates to a method of providing a support structure sorting system having a gap substantially closed between at least two support structures, the sorting system comprising a track having horizontal straight sections and horizontal curved sections,
  a plurality of non-tiltable or tiltable load support structures,
  a plurality of linked conveying carts adapted to support and convey the support structures along the track in a conveying direction, and the method comprises providing a cover plate arranged with a support structure so as to substantially close a gap between the support structure and an adjacent support structure, and providing a leading system configured to
- connect the cover plate to the support structure and for the support structure to carry the cover plate and any item located at least partly on the cover plate,
- and allow rotation of the cover plate relative to the support structure about an axis, which is vertical, when the cover plate is untilted and in a horizontal straight section of the track,
- and allow motion of the cover plate relative to the support structure back and forth in the conveying direction,
- and substantially center the cover plate relative to the adjacent support structure, when the cover plate and the adjacent support structure are in a horizontal straight section of the track, and providing a guiding system comprising a first and a second part,
- where one part of the first and second parts is connected to the cover plate,
- and the other part of the first and second parts is fixated directly or indirectly to an adjacent cart, which adjacent cart is located in a direction, in which direction the cover plate and the adjacent support structure are located, and wherein fixated indirectly includes that the other part of the first and second parts of the guiding system is fixated to any element located on the adjacent cart, including to a non-tilting support structure, a support for a non-tilting support structure, a tilting mechanism or a tiltable support structure,
- and where the first and second parts of the guiding system constrain the cover plate from moving back and forth in the conveying direction,
- and where the first and second parts of the guiding system are movably arranged relative to each other in a plane, which plane is vertical and transverse to the conveying direction, when the cover plate is in a horizontal straight section of the track, and wherein the method comprises that the motion of the cover plate is led and guided by the leading system and the guiding system.

By this method, it is obtained, to substantially close a gap between the support structure and an adjacent support structure with the cover plate during operation of the sorting system. The support structures may be plane or non-plane.

Also, the method may involve, that the sorting system is of a tiltable support structure type, which may have a plurality of linked conveying carts adapted to support and convey the support structures along the track in a conveying direction as well as tilt the support structures, wherein the sorting system may have a leading system configured to connect the cover plate to the support structure, for the cover plate and the support structure to be tilted together.

Moreover, the method may involve that one part of the first and second parts of the guiding system is connected pivotably or bendably to the cover plate in order to allow rotation or bending of the cover plate substantially as a whole about an axis, which is horizontal and transverse to the conveying direction, when the cover plate is untilted and in a horizontal straight section of the track. It is hereby obtained, that the support structure and the cover plate may be conveyed in sections of a track comprising sections of a group selected from inclined straight sections, declined straight sections, inclined curved sections and declined curved sections, including transitions between such sections of the track, while the support structures and cover plates are tilted or untilted.

The method may involve, that the track is horizontal and comprises straight and curved sections, and wherein one part of the first and second parts of the guiding system is fixated to the cover plate and the other part of the first and second parts is fixated directly or indirectly to an adjacent cart, which adjacent cart is located in a direction, in which direction the cover plate and the adjacent support structure are located, and wherein fixated indirectly includes that the other part of the first and second parts of the guiding system is fixated to any element located on the adjacent cart, including to a non-tilting support structure, a support for a non-tilting support structure, a tilting mechanism or a tiltable support structure. A horizontal track enables a simpler method, where pivoting of the cover plate as a whole by using a hinge or a deformable element may be avoided. The wording load support structure is used interchangeably with support structure.

BRIEF DESCRIPTION OF THE FIGURES

Aspects according to the invention will now be described in more detail with regard to the accompanying figures. The figures show ways of implementing the present invention and are not to be construed as being limiting to other possible embodiments falling within the scope of the attached claim set.

FIG. 1 is a side view of parts of known art carriers of a sorting system,

FIG. 2 is a top view of parts of known art support structures,

FIG. 3 is a side view of parts of known art carriers of a sorting system shown without a track, FIG. 4 is a top view of support structures and cover plates according to the invention.

DETAILED DESCRIPTION

Figure 5:
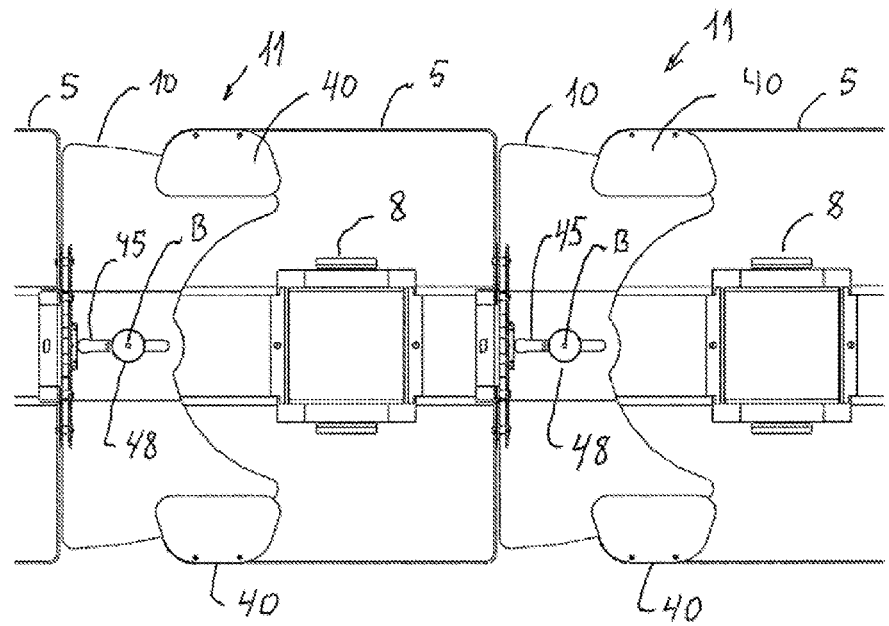
FIG. 5 is a sectional bottom view of support structures, cover plates and leading systems according to the invention.

FIGS. 1 to 3 all show known art. FIG. 1 shows elements of a sorting system 1 having carriers 21 with carts 7. One cart 7 is supporting a tilting mechanism 8 and a support structure 5. The carts 7 are linked together to form a chain of carts. In order to convey the support structures untilted or tilted in curved sections of a non-shown track, gaps 15 are normal.

In FIG. 2 support structures 5 are shown, where one support structure has a convex end 16 and a distance to the adjacent support structure, whereby a gap 15 is created.

FIG. 3 shows elements of a sorting system 1 having carriers 21 with carts 7, supporting tilting mechanisms 8 and support structures 5. The carts 7 are linked together. In order to convey the support structures tilted or untilted in curved sections of a non-shown track, gaps 15 are normal. In the situation shown, the support structures 5 are longer than the carts 7, so an intermediate cart 52 is provided between the support structure-carrying carts 7. Two, three or more intermediate carts may be used, depending on the length of the support structures and the cart length.

FIG. 4 shows support structures 5 having cover plates 10 arranged between them. The cover plates 10 have longitudinal holes 45 having a direction, indicated by the dash-dot line 14, in line with a central part 54 of an adjacent support structure.

FIG. 5 shows support structures 5 with tilting mechanisms 8. Cover plates 10 are arranged between adjacent support structures. The cover plates 10 have longitudinal holes 45, where holding elements 48 hold the cover plates in connection with the support structures through the longitudinal holes. The cover plates are led by leading systems 11 having leading elements 40 and holding elements, which are connected to the support structures. The cover plates are engaged to the support structure for the cover plate and the support structure to be tilted together and for the support structure including the leading system to carry the cover plate and any item located at least partly on the cover plate. Rotation of the cover plate relative to the support structure is allowed about an axis, which axis is vertical, when the cover plate is untilted and in a horizontal section of the track as represented by the axes B in FIGS. 5 and 6. Also, motion of the cover plate relative to the support structure back and forth in the conveying direction is allowed by the leading system 11. The cover plates 10 may move back and forth relative to support structures 5 by sliding in the recesses provided by the leading elements 40 and/or the holding elements 48. Also, the longitudinal holes 45 allow the cover plates to move back and forth relative to the support structures. The longitudinal holes 45 and the holding elements connected to the support structures center or substantially center the cover plates relative to adjacent support structures, when the cover plates are in a horizontal straight section of the track. The longitudinal hole 45 may not be placed centered in the cover plate and still have a centering function.

Figure 6:
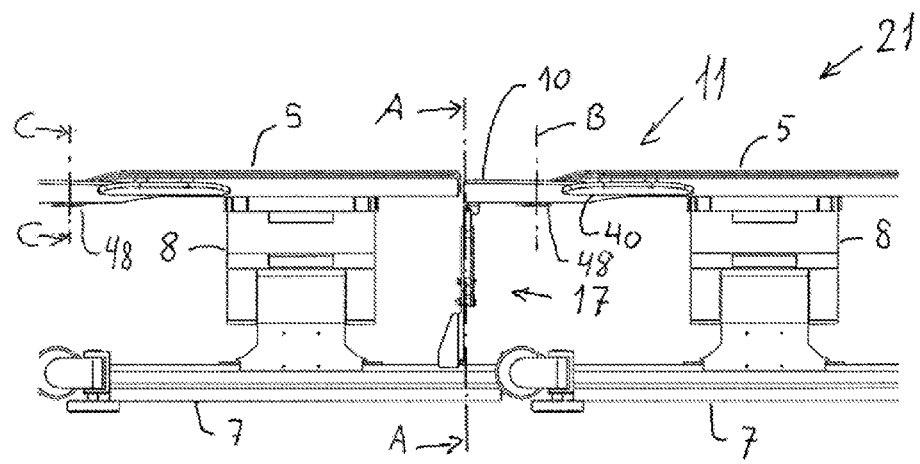
FIG. 6 is a side view of two carriers with carts, support structures, cover plates and a guiding system.
Figure 7:
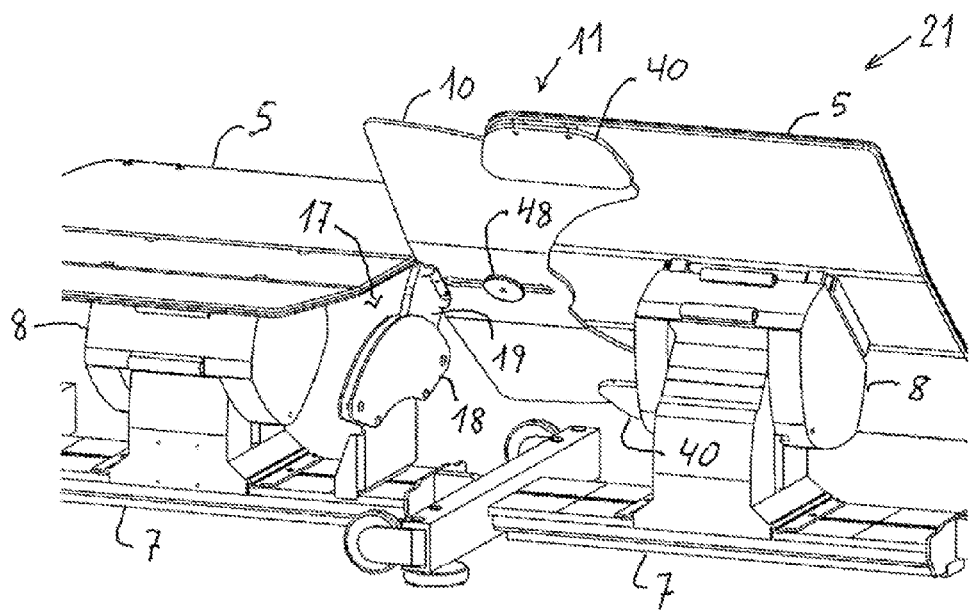
FIG. 7 is a perspective view of two carriers in part, where one support structure and a cover plate are tilted together.

FIG. 6 shows carriers 21 with carts 7, tilting mechanisms 8 and support structures 5. A cover plate 10 is arranged with a support structure and extends to an adjacent support structure 5. The cover plate is held to the support structure by a leading element 40 and a holding element 48. Vertical axes as mentioned in relation to FIG. 5, are also shown in FIG. 6 as axes B, which are extending centrally through the holding elements 48. A guiding system 17 is fixated to an adjacent cart 7 and connected to the cover plate. Referring to FIGS. 6 and 7, it is shown, that one part of the first part 18 and the second part 19 of the guiding system 17 is attached to the cover plate. The other part of the first part 18 and the second part 19 is fixated to an adjacent cart 7. The first part 18 and second part 19 of the guiding system 17 constrain the cover plate 10 from moving back and forth in the conveying direction 13, cf. FIGS. 25 and 26. It is optional to place the cover plate in front or backwards of an associated support structure in the conveying direction. The first part 18 and second part 19 of the guiding system 17 are movably arranged relative to each other in a plane, which plane is vertical and transverse to the conveying direction, when the cover plate is in a horizontal section of the track. The plane is indicated by the dash-dot section A-A in FIG. 6.

The first part 18 and the second part 19 of the guiding system 17 may, in order to take account of production tolerances, be arranged relative to each other in a plane, which plane is substantially vertical and transverse to the conveying direction, when the cover plate is in a horizontal section of the track, when a hinge or a deformable element is used to connect one of the first and second parts to the cover plate 10.

FIG. 7 shows carts 7 with tilting mechanisms 8 and support structures 5. A cover plate 10 is arranged with one support structure and extends to an adjacent support structure 5. The cover plate and its associated support structure are tilted together. The adjacent support structure is untilted. The cover plate is led and guided by a leading system 11 having leading elements 40 and a holding element 48, as well as by a guiding system 17 having a first part 18 and a second part 19.

Figure 8A:
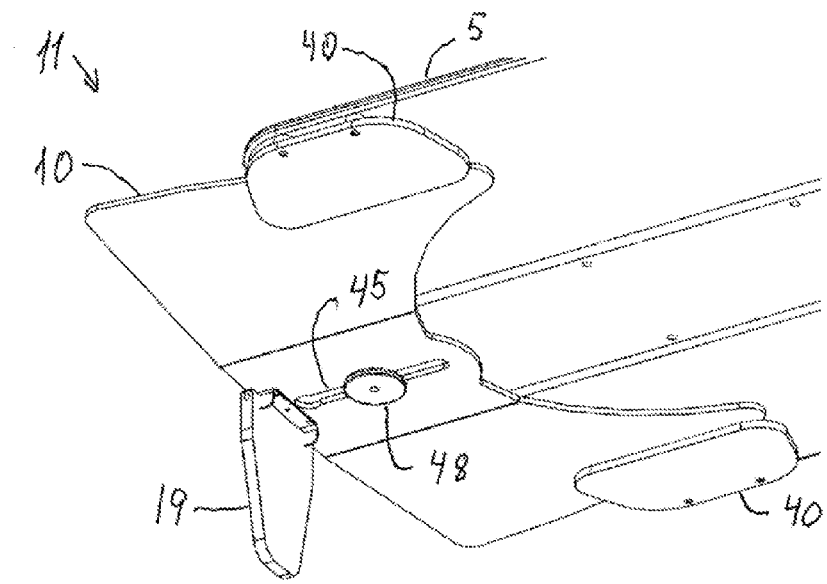
FIGS. 8A and 8B show perspective views of support structures, which include a leading system and an upright forming a part of a guiding system.

FIG. 8A shows a cover plate 10 arranged with a support structure 5. The cover plate is connected to the support structure by leading elements 40 and a holding element 48. The holding element 48 has a larger dimension than a width of the longitudinal hole 45, so the holding element 48 cannot pass through the longitudinal hole 45. A second part 19 of a guiding system is connected to the cover plate.

Figure 8B:
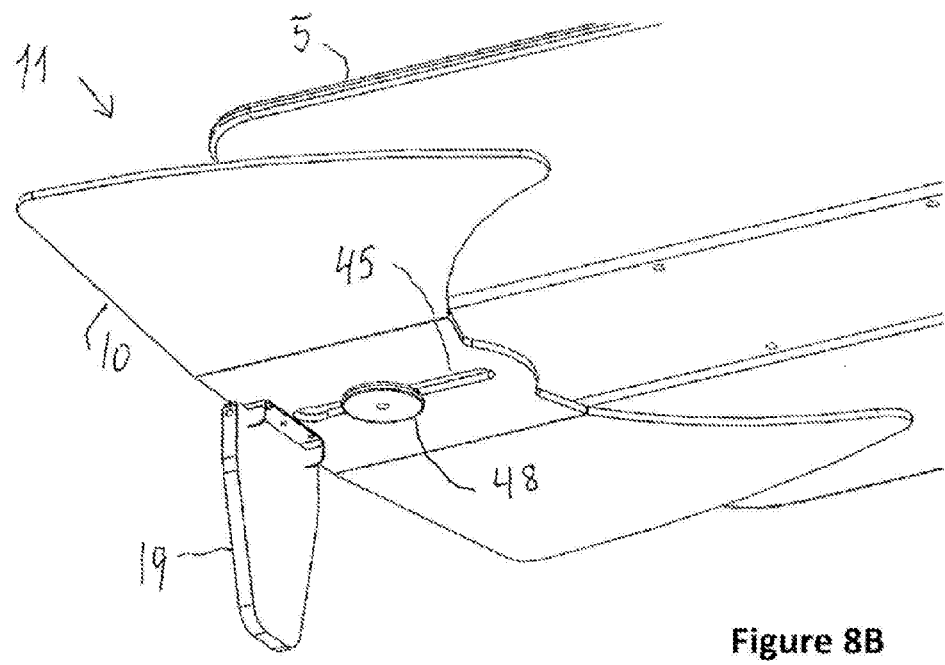

FIG. 8B shows a cover plate 10 arranged with a support structure 5. The cover plate is connected to the support structure by a leading system 11 having a holding element 48. The leading system may be connected to the support structure by at least one fastening means or at least one fastening element, which means or element is connected by a bolt, glue, double-sided adhesive tape, for connecting the cover plate via the longitudinal hole to the support structure. Also shown, is a second part 19 of a guiding system.

Figure 8C:
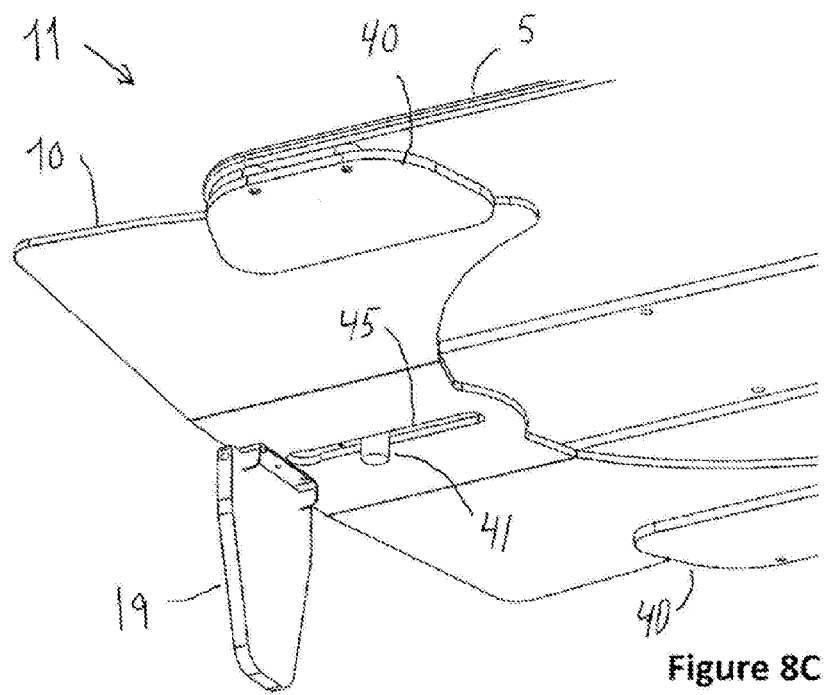
FIG. 8C shows a perspective view of a support structure with a leading system, where a pin is connected to the support structure and is extending from the support structure through a longitudinal hole in the cover plate.

FIG. 8C shows a cover plate 10 arranged with a support structure 5. The leading system 11 has a leading pin 41, which is connected to the support structure 5 and is extending from the support structure through the longitudinal hole 45, and where the leading pin has a width corresponding to a width of the longitudinal hole. The leading system also has leading elements 40. Also shown, is a second part 19 of a guiding system.

Figure 8D:
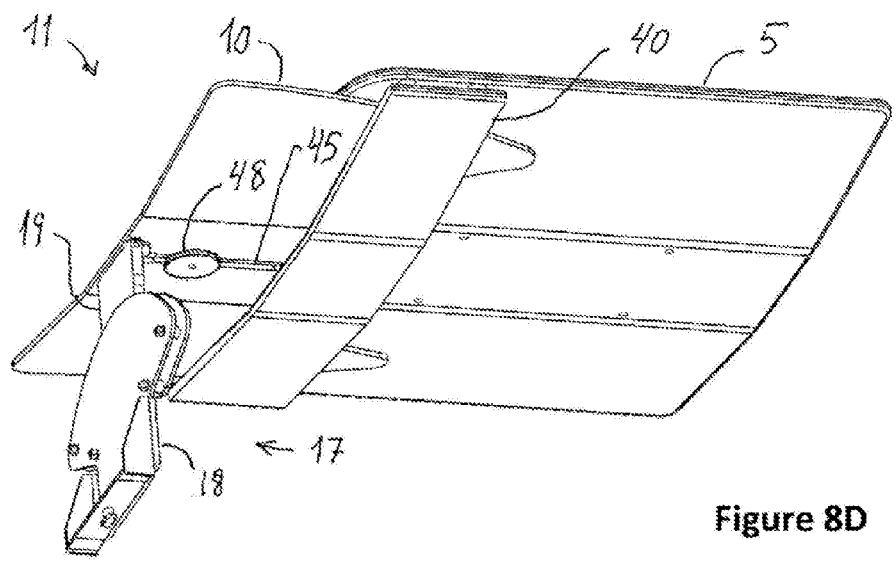
FIG. 8D shows perspective views of a support structure including a leading system and a guiding system.

FIG. 8D shows a cover plate 10 arranged with a support structure 5. The cover plate is connected to the support structure by one leading element 40 and a holding element 48. The leading element 40 extends across a width of the support structure. A guiding system 17 is having a first part 18 and a second part 19. The second part 19 is connected to the cover plate.

Figure 8E:
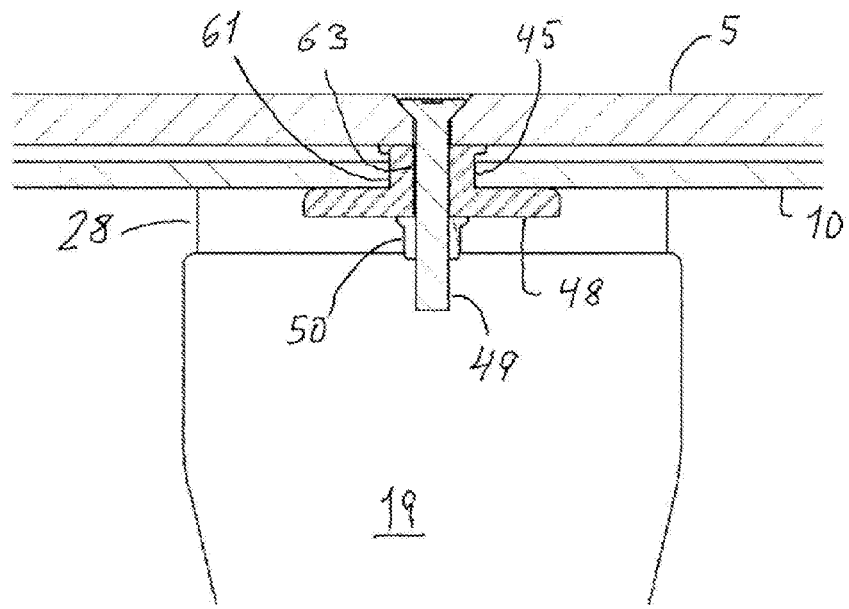
FIGS. 8E and 8F show simplified sectional views according to section C-C of FIG. 6.

FIG. 8E shows how a holding element 48 is attached to a support structure 5 through a longitudinal hole 45 in a cover plate 10. The holding element has a cylindrical section 61 engaged with the longitudinal hole 45 by providing a recess. A bolt 49 extends through the holding element via a through-going hole 63 to engage a nut 50. The holding element 48 provides a recess, which is used to engage and support the cover plate 10. A second part 19 of a guiding system is connected to the cover plate via a deformable element 28, which may be connected by gluing or by double-sided adhesive tape.

Figure 8F:
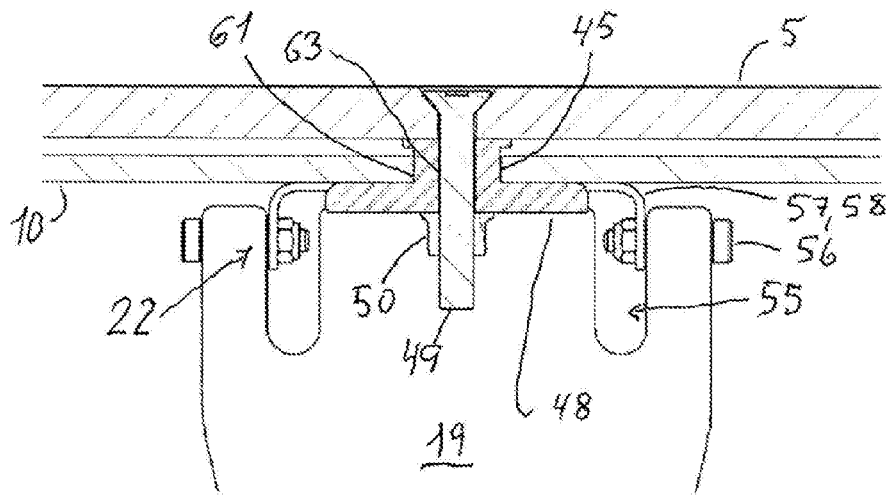

FIG. 8F also shows how a holding element 48 is attached to a support structure 5 through a longitudinal hole 45 in a cover plate 10. The holding element has a cylindrical section 61, which is engaged with the longitudinal hole 45. A bolt 49 extends through the holding element via a hole 63 to engage a nut 50. The holding element 48 provides a recess, which is used to engage and support the cover plate 10. A second part 19 of a guiding system is connected to the cover plate via hinges 22. The hinges 22 are provided by cut-outs 55 in the second part 19, a bracket 57 and two bracket arms 58 as well as bolts 56, which bolts extend through parts of the second part 19 and into the cut-outs 55 to engage the bracket arms 58. This is shown in another view in FIG. 17.

Figure 8G:
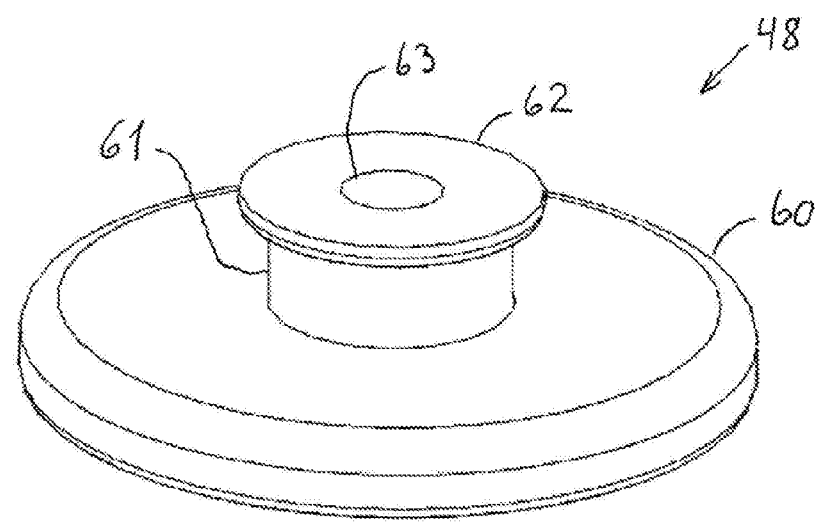
FIG. 8G shows a perspective view of a holding element.

FIG. 8G shows a holding element 48 having a lower larger disc-like shaped section 60 at the bottom, a cylindrical section 61 adapted for engagement with a non-shown longitudinal hole in a cover plate, an upper disc-like shaped section 62 and a through-going hole 63.

Figure 9:
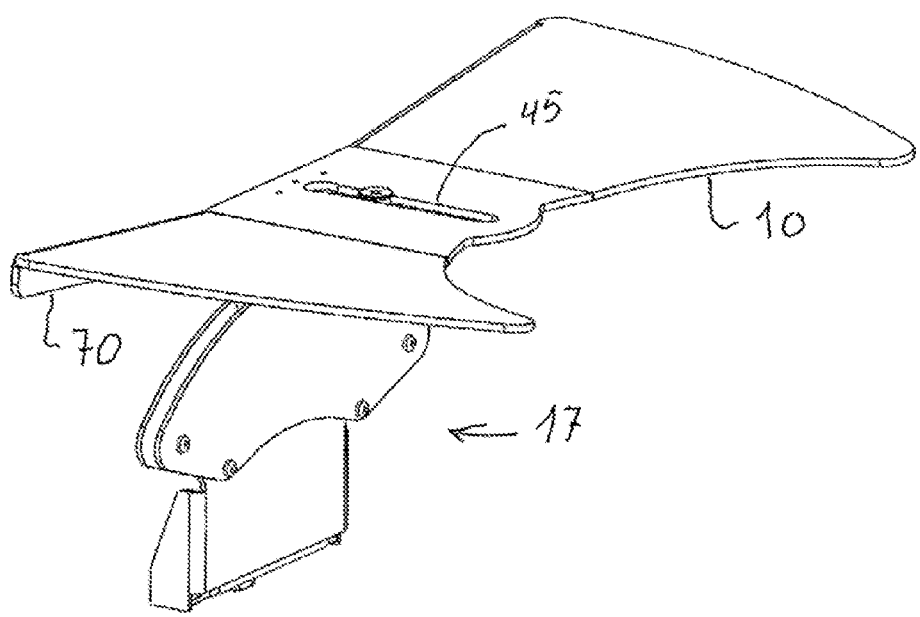
FIGS. 9 to 12 are perspective views of a cover plate and a guiding system.
Figure 10:
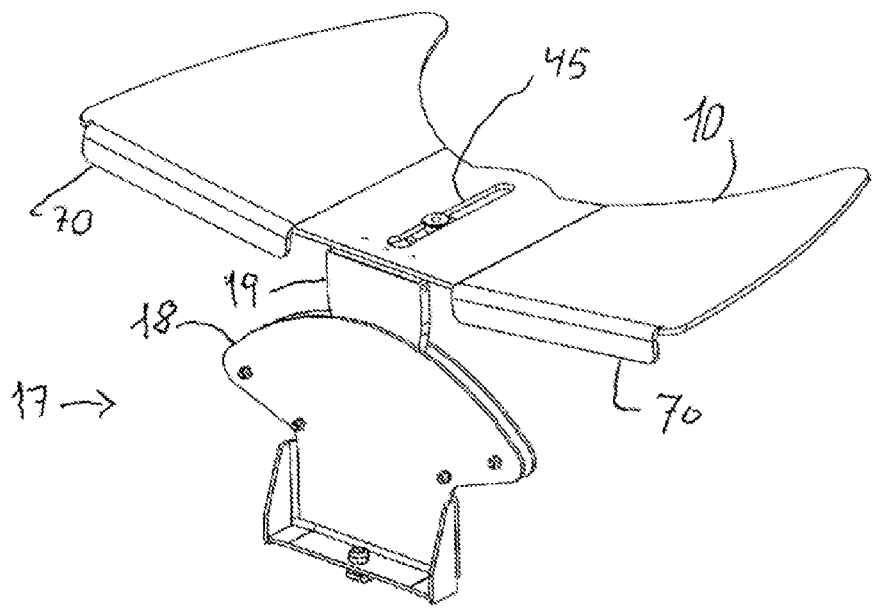

FIGS. 9 and 10 show a cover plate 10, which may have been manufactured by casting in order to be concave. A guiding system 17 is shown having a first part 18 and a second part 19, where the second part 19 is connected to the cover plate. The first part 18 is intended for being connected to a non-shown cart. In order to obtain a same functionality, the first part 18 may be connected to the cover plate and the second part 19 may be connected to a non-shown cart. The cover plates 10 may have flanges 70, which are substantially perpendicular to a main part of the cover plates.

Figure 11:
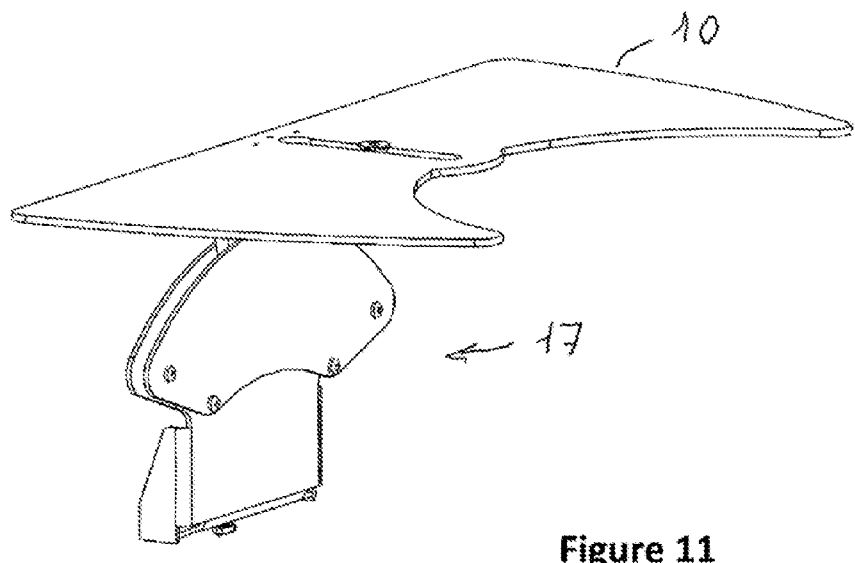

FIG. 11 shows a cover plate 10 connected to a guiding system 17. The cover plate 10 is plane and may be manufactured by high pressure water cutting.

Figure 12:
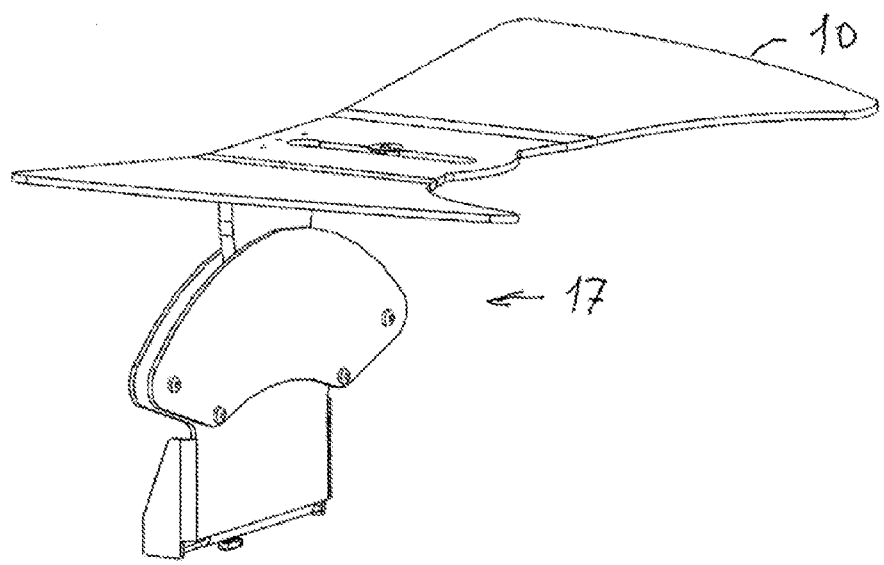

FIG. 12 shows a cover plate 10 connected to a guiding system 17. The cover plate is concave and may be manufactured by thermoforming of a plane plate.

Figure 13:
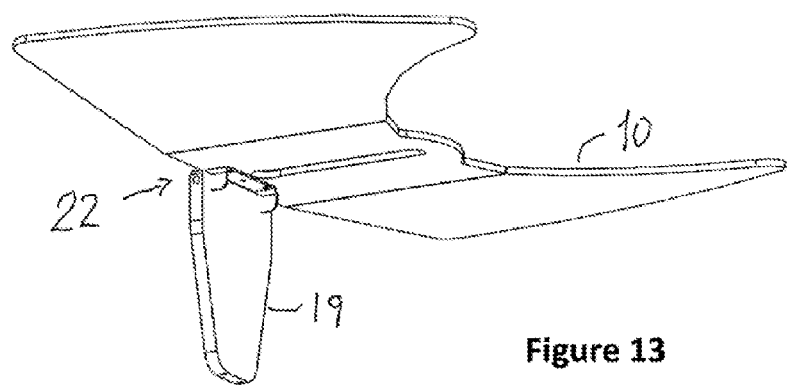
FIG. 13 is a perspective view of a cover plate and an upright forming a part of a guiding system.

FIG. 13 shows a cover plate 10. A second part 19 of a guiding system is pivotably connected to the cover plate with a hinge 22.

Figure 14:
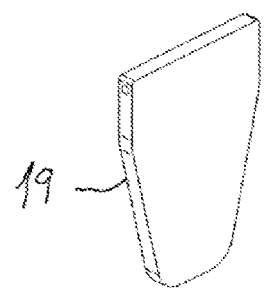
FIG. 14 is a perspective view of an upright forming a part of a guiding system.

FIG. 14 shows a second part 19 of a guiding system. It is preferably made of a polymeric material and is formed to a tongue-like shape for instance by high pressure water cutting of a plane plate.

Figure 15:
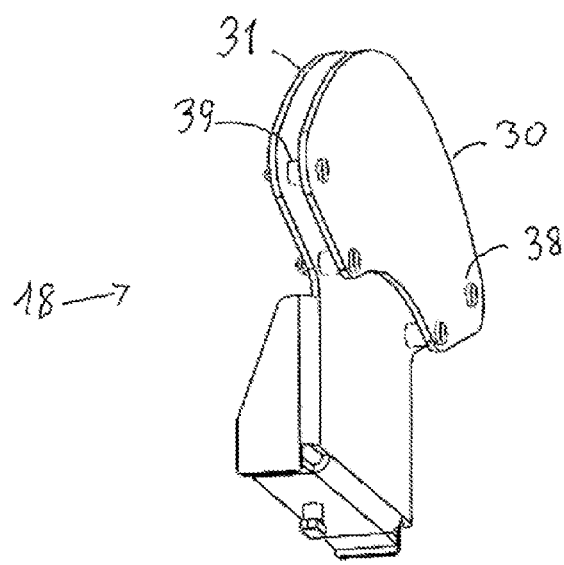
FIG. 15 is a perspective view of another part of a guiding system.

FIG. 15 shows a first part 18 of a guiding system. It has two plane and parallel plates 30 and 31. The plates are fixated to each other by spacers 39 and bolts 38. The plates may be made from metal, such as steel or aluminium.

Figure 16:
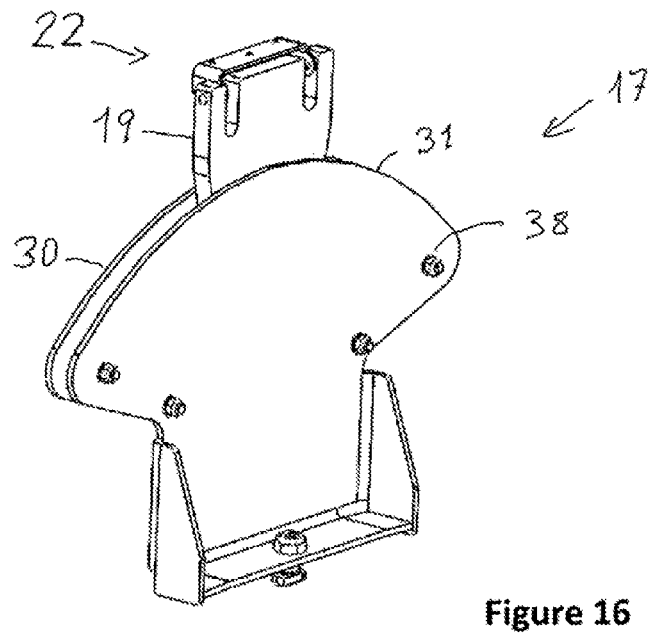
FIG. 16 is a perspective view of a guiding system and a hinge.

FIG. 16 shows a guiding system 17 having a first part 18 and a second part 19, which parts are engaged. A hinge 22 is connected to the second part 19. The plane second part 19 is located between parallel plates 30 and 31. The thickness of the second part 19 corresponds to a distance between the parallel plates.

Figure 17:
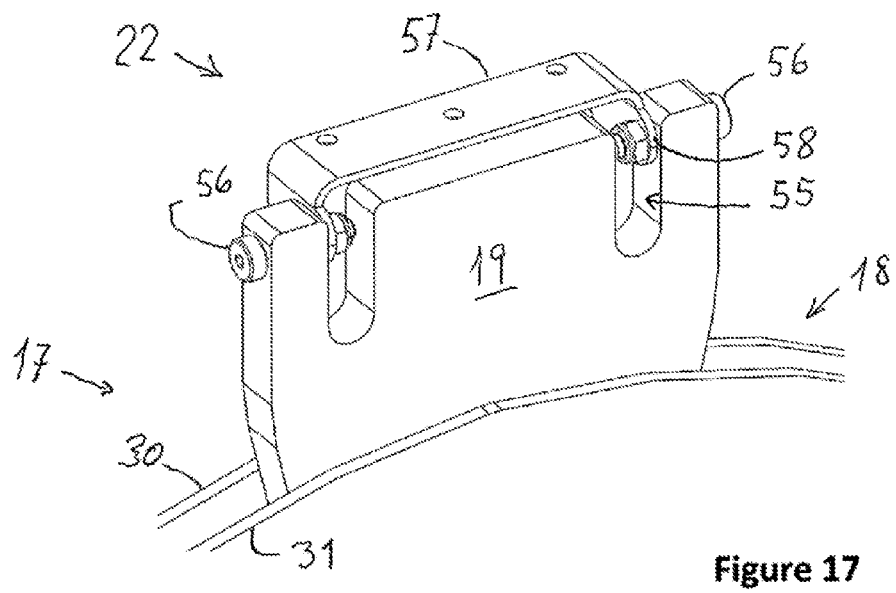
FIG. 17 is a sectional view showing in part a guiding system with hinges.

FIG. 17 shows a guiding system 17 having first and second parts 18, 19. The hinges 22 are provided by cut-outs 55 in the second part 19, a bracket 57 and two bracket arms 58 as well as bolts 56, which extend through parts of the second part 19 and into the cut-outs 55 to engage the bracket arms 58. The plane second part 19 is located between parallel plates 30 and 31. The thickness of the second part 19 corresponds to a distance between the parallel plates.

Figure 18:
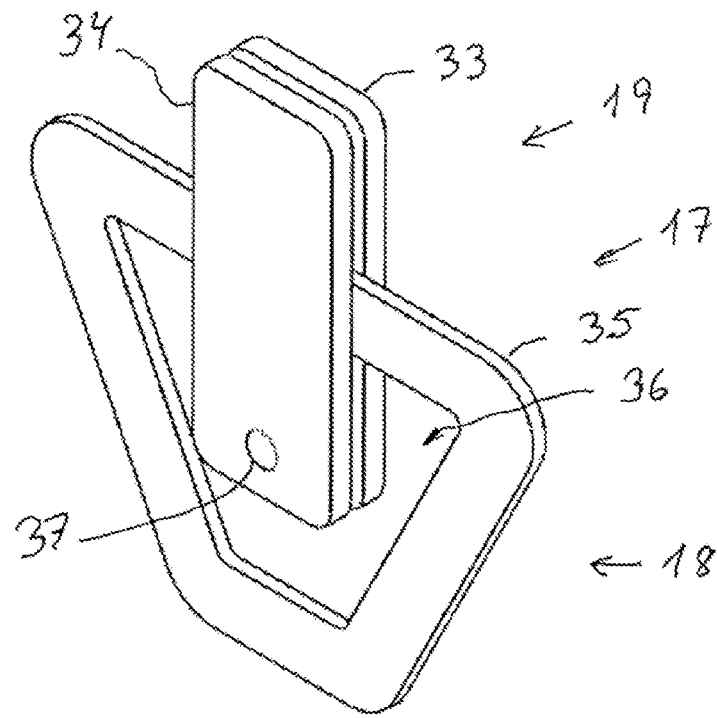
FIG. 18 is a perspective view of an alternative embodiment of a guiding system.
Figure 19:
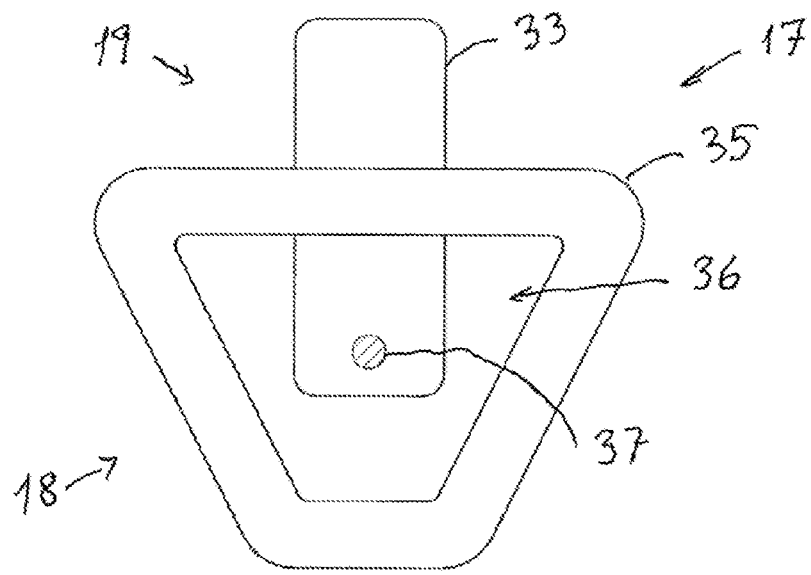
FIG. 19 is a front view of a section of an alternative embodiment of a guiding system.

FIG. 18 shows a guiding system 17 having first and second parts 18, 19. The first part is made from a plane plate 35 having a cut-out 36. Two plane uprights 33 and 34 are arranged with a distance corresponding to the thickness of the plate. The two uprights are connected by a pin 37. FIG. 19 is a cross-sectional view of FIG. 18, where the second upright 34 is not shown.

Figure 20:
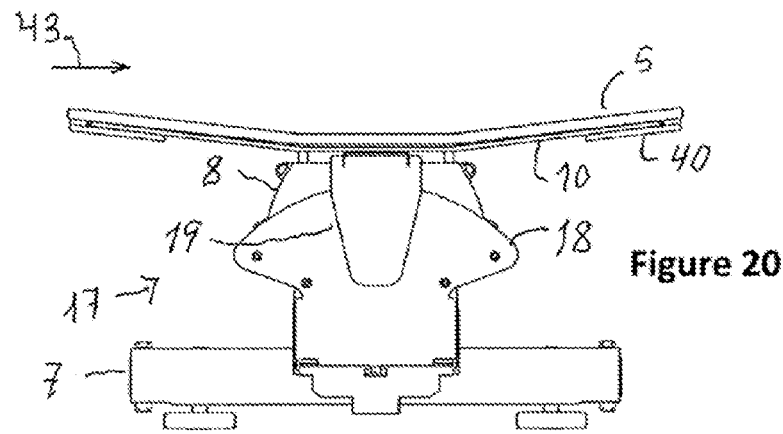
FIGS. 20 to 22 are simplified, sectional front views of carriers with a cover plate, a leading system and a guiding system, and are showing how parts of a guiding system relatively moves from an untilted situation to a fully tilted situation, and where the tilt is actuated by an electrically driven tilting mechanism. The views are according to section A-A of FIG. 6, FIGS. 23 and 24 are sectional front views, similar to FIGS. 20 to 22 of carriers with a cover plate, a leading system and a guiding system showing how parts of a guiding system relatively moves from an untilted situation to a fully tilted situation, and where the tilt here is actuated by a mechanically driven tilting mechanism.
Figure 21:
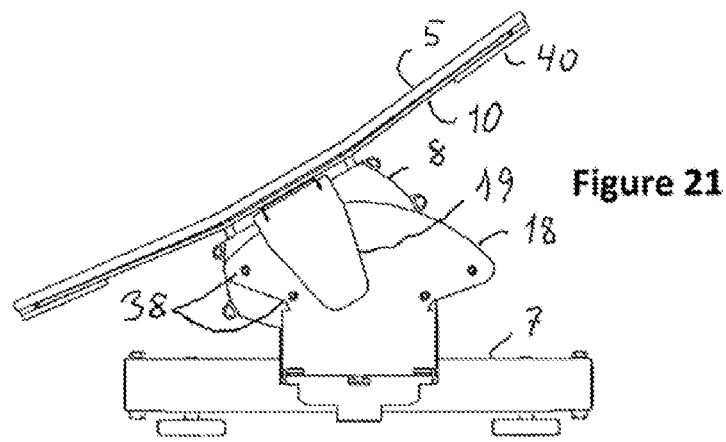
Figure 22:
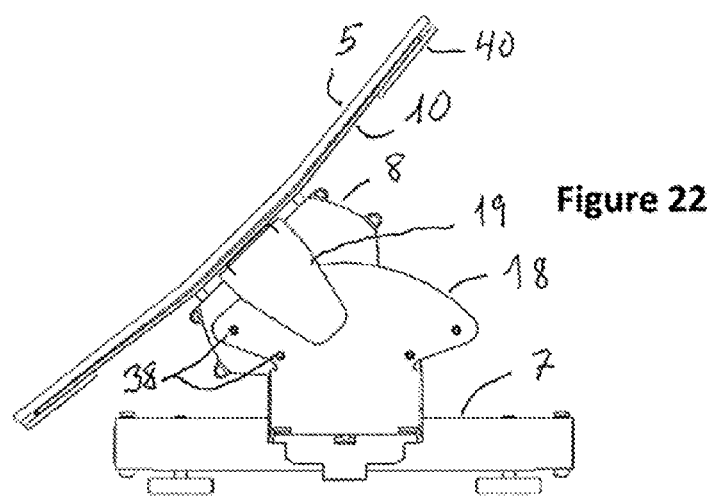

FIGS. 20 to 22 show that the second part 19 of the guiding system 17 may move relative to the first part 18, and vice versa. By moving or being movable is in this case meant displacement and rotation as the figures show a tiltable support structure. In case of a non-tiltable support structure, moving or being movable may mean displacement only. The guiding system 17 does not allow the cover plate to move either back or forth in the conveying direction. The guiding system 17, in the shown embodiments, disallow rotation and/or torsion about an axis, which axis, when the support structure and cover plate are conveyed horizontally in a straight section of a track, is horizontal and transverse to the track. If such rotation or torsion were allowed, this would allow the cover plate to move back and forth in the conveying direction and open a gap 15, cf. FIGS. 1 and 2.

From FIGS. 20 to 22 as described above it can be seen that both embodiments of a guiding system according to the invention may commonly include that the first and second parts of the guiding system are engaged with each other to constrain the cover plate from moving back and forth in the conveying direction, and wherein one of the parts extends so widely in plane, which plane is vertical and transverse to the conveying direction, when the cover plate is in a horizontal straight section of the track, that the other part may move and optionally rotate relative to the one part in that plane.

FIGS. 20 to 22 show tilting of the support structure 5 and cover plate 10. The cover plate 10 is held in recesses, which here are provided by leading elements 40. Also shown is a cart 7 and a tilting mechanism 8. FIGS. 20 to 22 are cross-sectional views of a plane corresponding to section A-A, cf. FIG. 6. The guiding system 17 is shown in a way, where relative motion between the second part 19 and the first part 18 is visible.

In order to better see the motion between the first and second parts, bolts 38 are shown. The second part 19 is attached to the cover plate and the first part 18 is fixated to a cart 7. The first and second parts of the guiding system 17 constrain the cover plate from moving back and forth in a conveying direction. The first and second parts of the guiding system 17 are movably arranged relative to each other in a plane, which plane is vertical and transverse to the conveying direction, when the cover plate is in a horizontal straight section of a non-shown track. The tilting mechanism 8 is here of an electrically driven type without a fixed tilting axis, but is moving up, down, sideways and rotating. FIG. 20 shows a direction 43 in which the support structure and the cover plate are concave.

Figure 23:
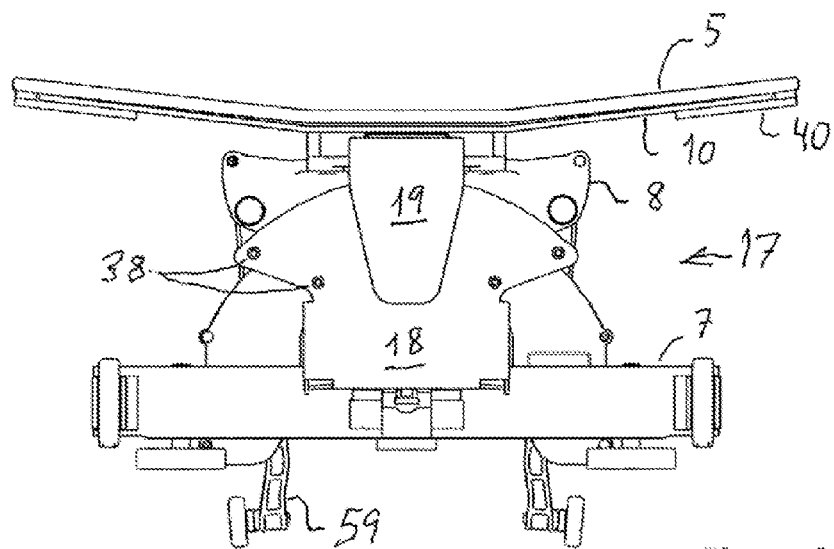
Figure 24:
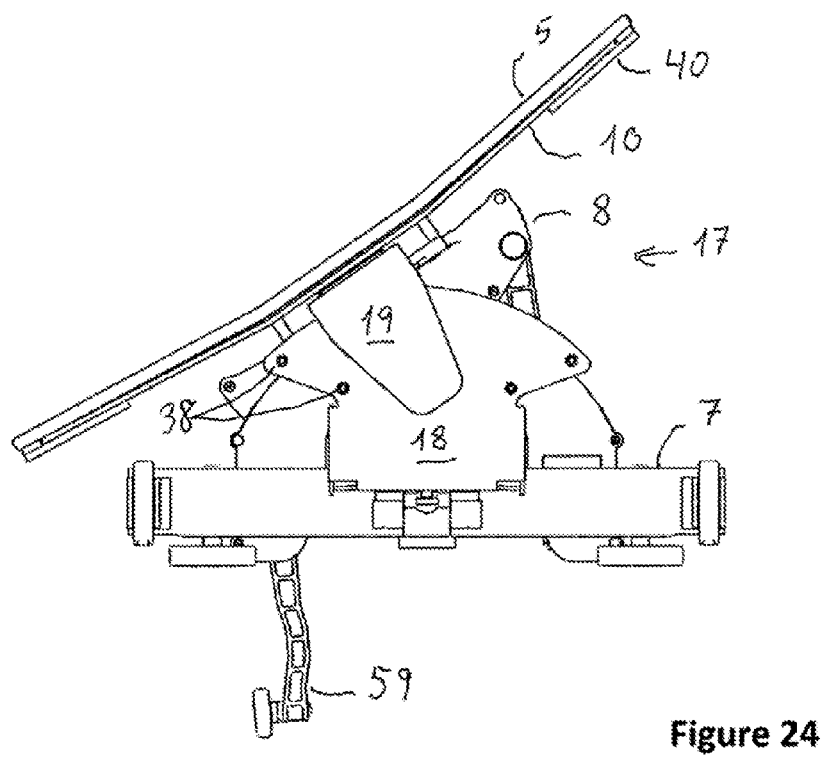

FIGS. 23 and 24 show tilting of the support structure 5 and cover plate 10. The cover plate 10 is held in recesses, which here are provided by leading elements 40. Also shown is a cart 7 and a tilting mechanism 8. FIGS. 23 and 24 are cross-sectional views like FIGS. 20 to 22. The guiding system 17 is shown in a way, where relative motion between the second part 19 and the first part 18 is visible. In order to better see the motion between the first and second parts, bolts 38 are shown. The second part 19 is attached to the cover plate and the first part 18 is fixated to a cart 7. The first and second parts of the guiding system 17 constrain the cover plate from moving back and forth in a conveying direction. The first and second parts of the guiding system 17 are movably arranged relative to each other in a plane, which plane is vertical and transverse to the conveying direction, when the cover plate is in a horizontal section of a non-shown track. The tilting mechanism 8 is here of a mechanical type with a fixed tilting axis. Tilting is done by moving the activation arm 59. The activation arm is adapted to engage non-shown means for activation, such as a rail section.

Figure 25:
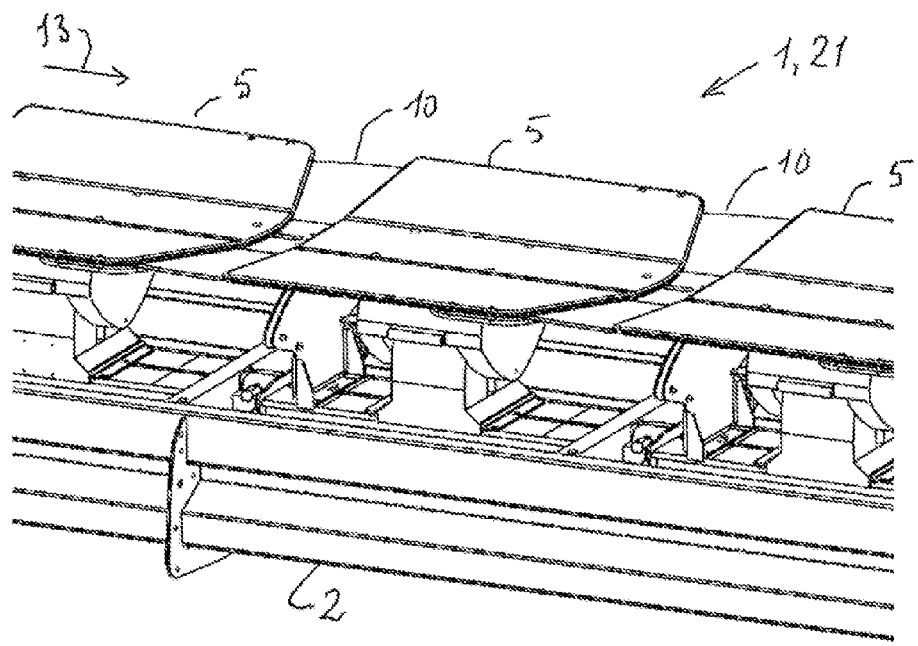
FIG. 25 shows a perspective view of a section of a sorting system with a straight track.
Figure 26:
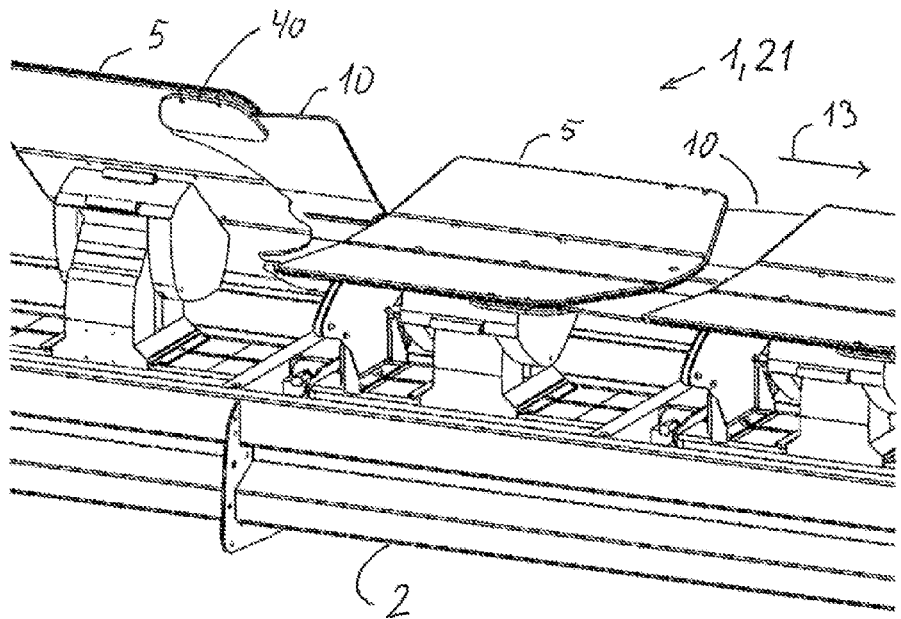
FIG. 26 shows a perspective view of a section of a sorting system with a straight track, where one support structure and a cover plate are tilted to one side.
Figure 27:
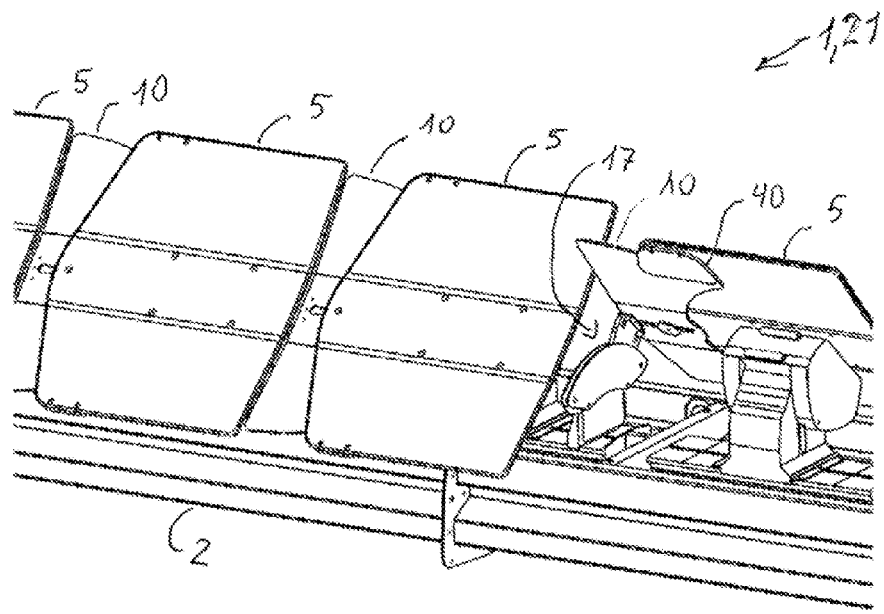
FIG. 27 shows a perspective view of a section of a sorting system with a straight track and carriers, where one support structure and a cover plate are tilted to one side and other support structures and cover plates are tilted to an opposite side.
Figure 28:
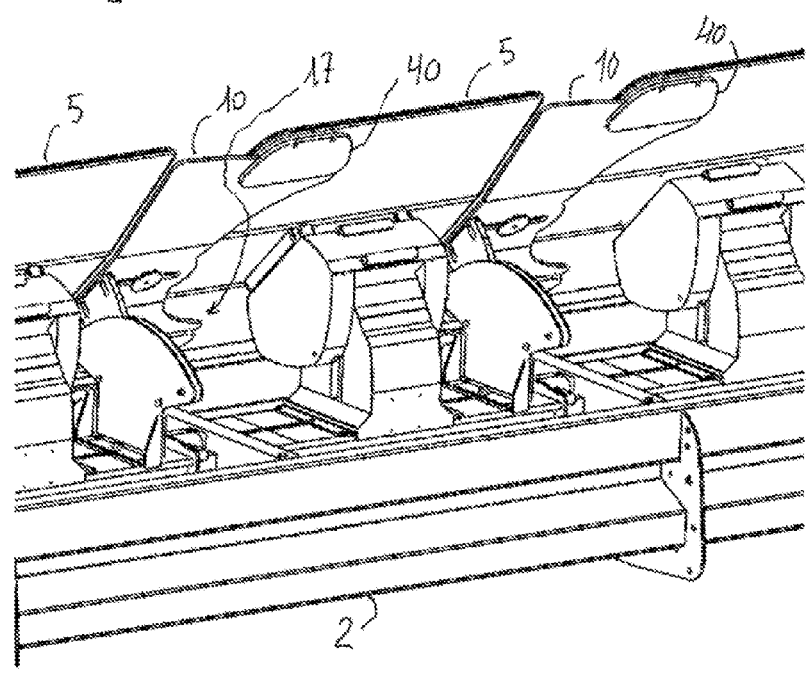
FIG. 28 shows a perspective view of a section of a sorting system with a straight track and carriers, where all support structures and cover plates are tilted to a same side.

FIGS. 25 to 28 show parts of a sorting system 1 with a horizontal and straight track 2. Carriers 21 are conveyed in a conveying direction 13. The carriers 21 have support structures 5 engaged with cover plates 10, which are held in position by leading elements 40. In FIG. 25 all support structures are untilted. In FIG. 26 one support structure is tilted and the others are untilted. In FIG. 27 three support structures are tilted to one side and one is tilted oppositely. In FIG. 28 all support structures are tilted to a same side. It is hence shown that any support structure 5 with a cover plate 10 may be tilted to any side, or remain untilted, independently of how the other support structures are operated.

Figure 29:
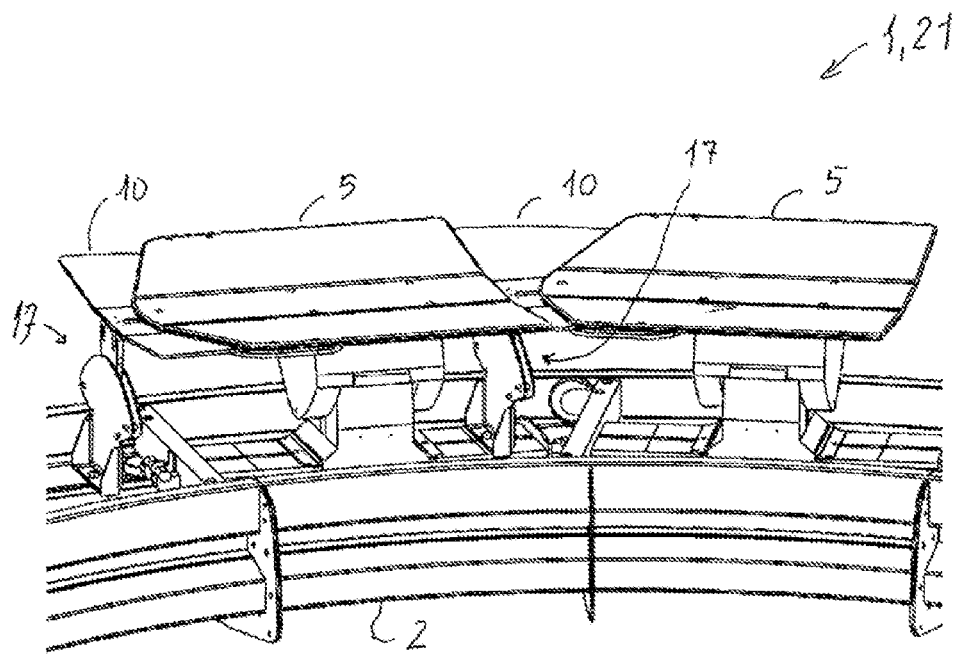
FIG. 29 shows a perspective view of a section of a sorting system with a curved track and two carriers, where support structures and cover plates are untilted.

FIG. 29 shows part of a sorting system 1 having carriers 21 conveyed in a horizontal and curved section of a track 2. The carrier 21 to the right side has a support structure 5 with a cover plate 10 to close a gap 15 shown in FIGS. 1 and 2. Two guiding systems 17 are also shown.

Figure 30:
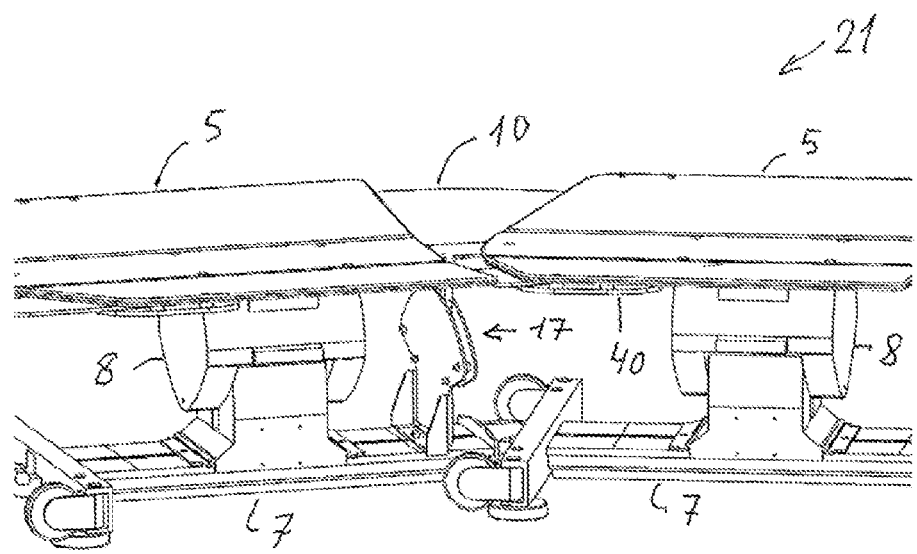
FIG. 30 shows a perspective view of two carriers, where support structures and cover plates are untilted.

FIG. 30 shows carriers 21 having support structures 5 with a cover plate 10 arranged between them. The cover plate is led and guided by leading elements 40 and a guiding system 17. The guiding system 17 has one part fixated to a cart 7, over which cart an adjacent support structure 5 is located. Another part of the guiding system 17 is connected to the cover plate. The support structures 5 may be tilted by tilting mechanisms 8 connected to the carts 7.

Figure 31:
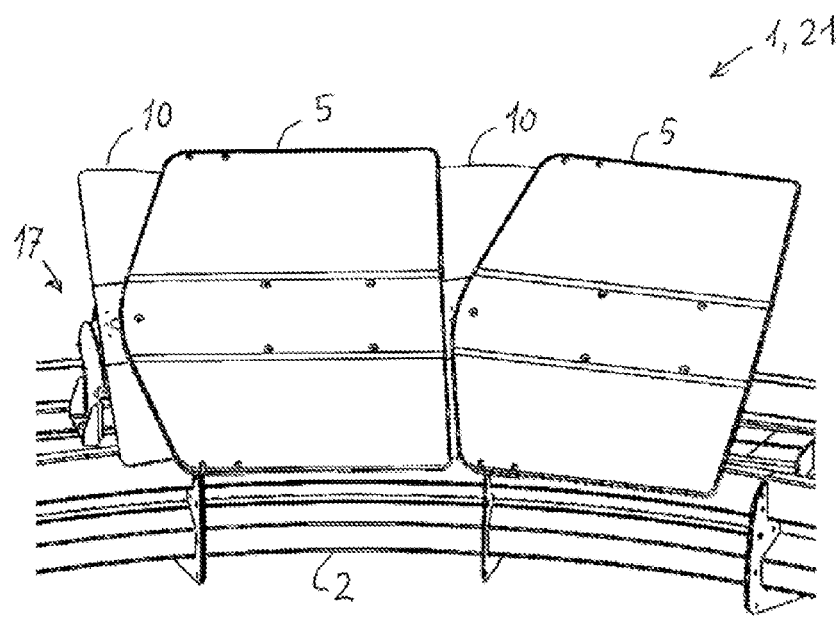
FIG. 31 shows a perspective view of a section of a sorting system with a curved track and two carriers, where support structures and cover plates are tilted in the curve.

FIG. 31 shows part of a sorting system 1 with carriers 21 conveyed through a horizontal and curved section of a track 2. Support structures 5 and cover plates 10 are tilted inwardly in the curved track. A guiding system 17 is also shown. FIGS. 30 and 31 show how the cover plates 10 move relative to the support structures 5.

Figure 32:
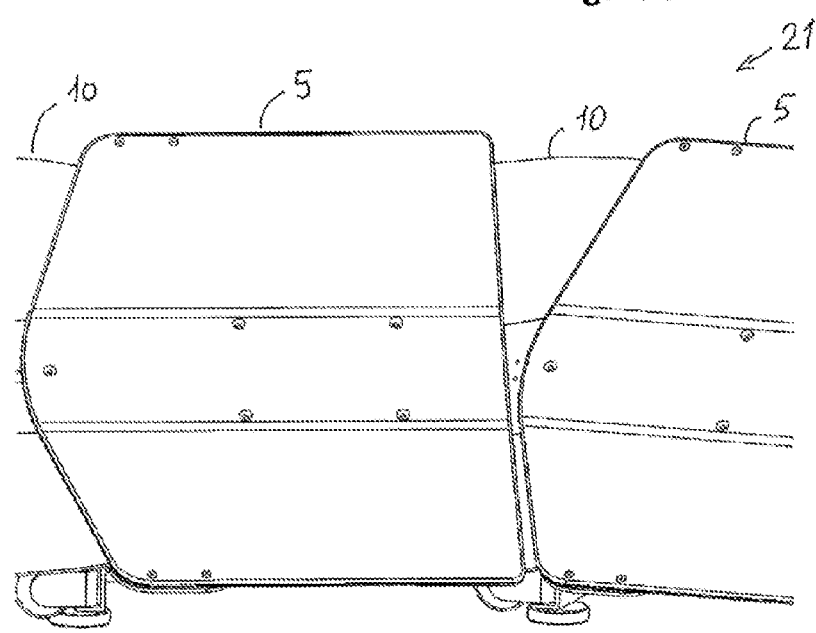
FIG. 32 shows a perspective view of two carriers, where support structures and cover plates are tilted.

FIG. 32 shows carriers 21 with support structures 5 and cover plates 10 in a tilted position corresponding to FIG. 31.

Figure 33:
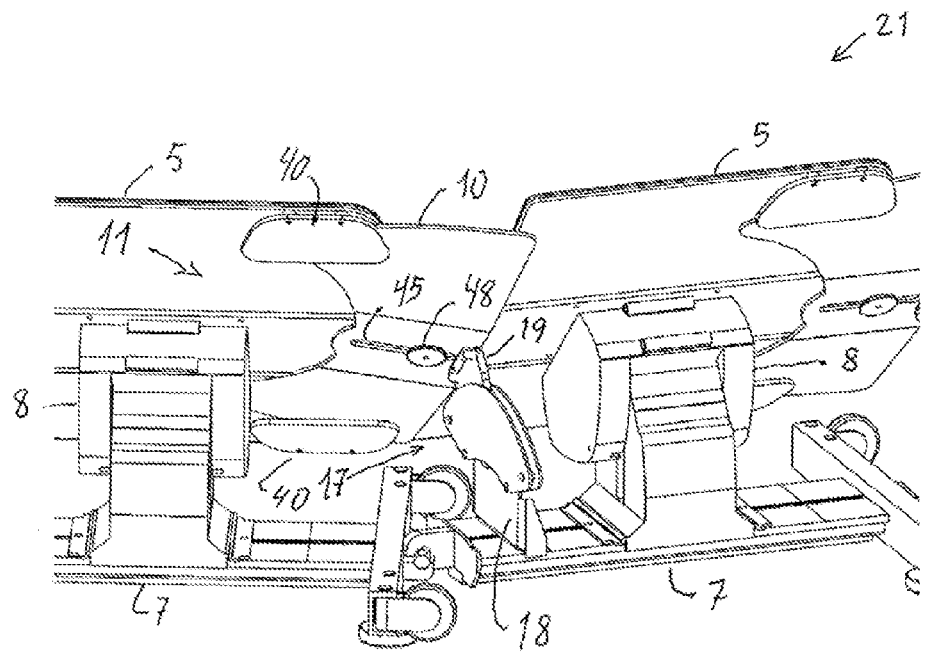
FIG. 33 shows a perspective view of two carriers, where support structures and cover plates are tilted, where the view is seen from a side, which is opposite to the view in FIG. 32.

FIG. 33 shows carriers 21 in a position as being conveyed in a non-shown horizontal and curved section of a track. The carriers have support structures 5 and cover plates 10. The carriers also have carts 7 and tilting mechanisms 8. The carrier to the left side has a leading system 11 with leading elements 40 and a holding element 48 connected to the support structure. The holding element 48 is connected to the support structure through the longitudinal hole 45. A guiding system 17 has a first part 18 fixated to the right side adjacent cart 7 and a second part 19 connected to the cover plate 10.

Figure 34:
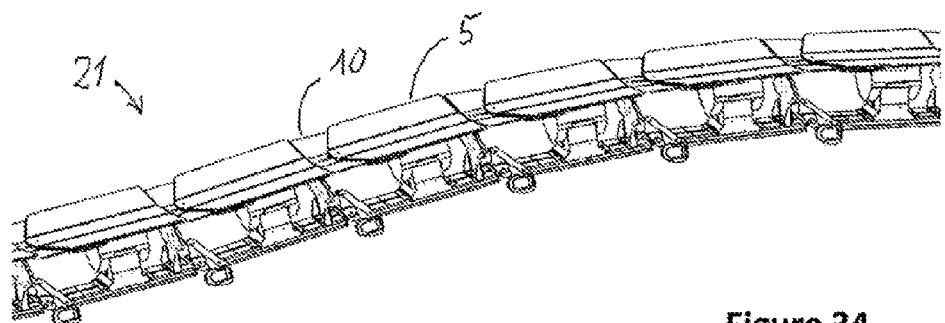
FIG. 34 is a perspective view of carriers with support structures and cover plates untilted, where the carriers are shown as coming from a straight and horizontal conveyed situation passing through a straight inclined situation and onwards to a straight horizontal situation.
Figure 35:
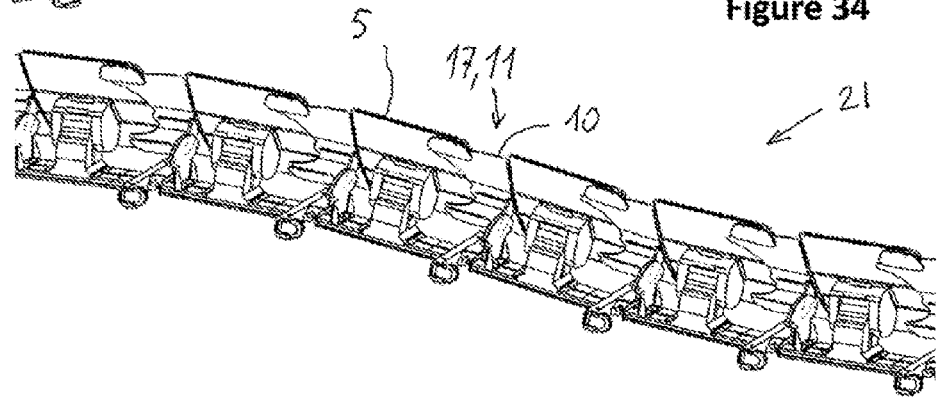
FIG. 35 is a perspective view of carriers with support structures and cover plates tilted, where the carriers are shown as coming from a straight and horizontal conveyed situation passing through a transition to a straight inclined situation and onwards through a transition to a straight horizontal situation.

FIGS. 34 and 35 show carriers 21 with support structures 5 and cover plates 10. FIG. 34 shows the carriers as moved along a non-shown straight and inclined track. The support structures and cover plates are untilted in FIG. 34 and tilted in FIG. 35.

Figure 36:
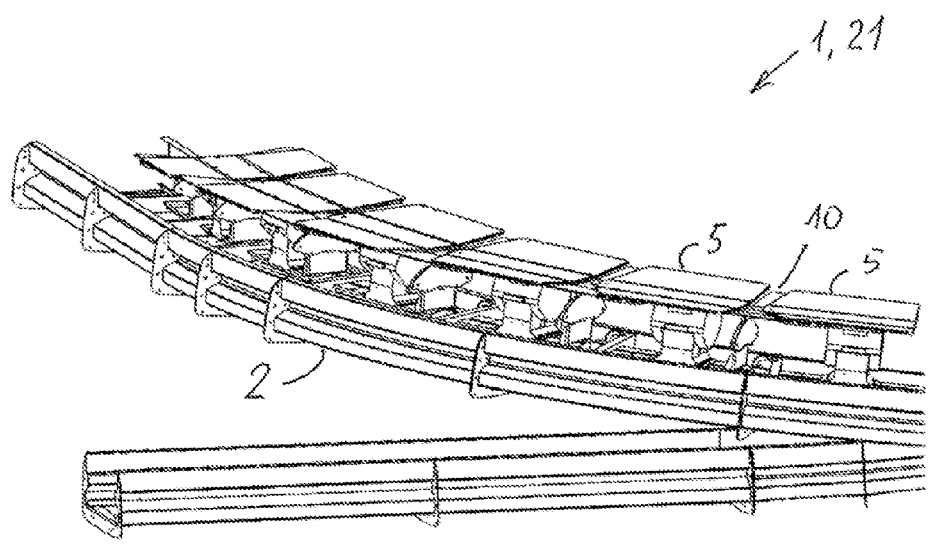
FIG. 36 shows a perspective view of a section of a sorting system with a declined curved track and six carriers, where support structures and cover plates are untilted in the declined curve.
Figure 37:
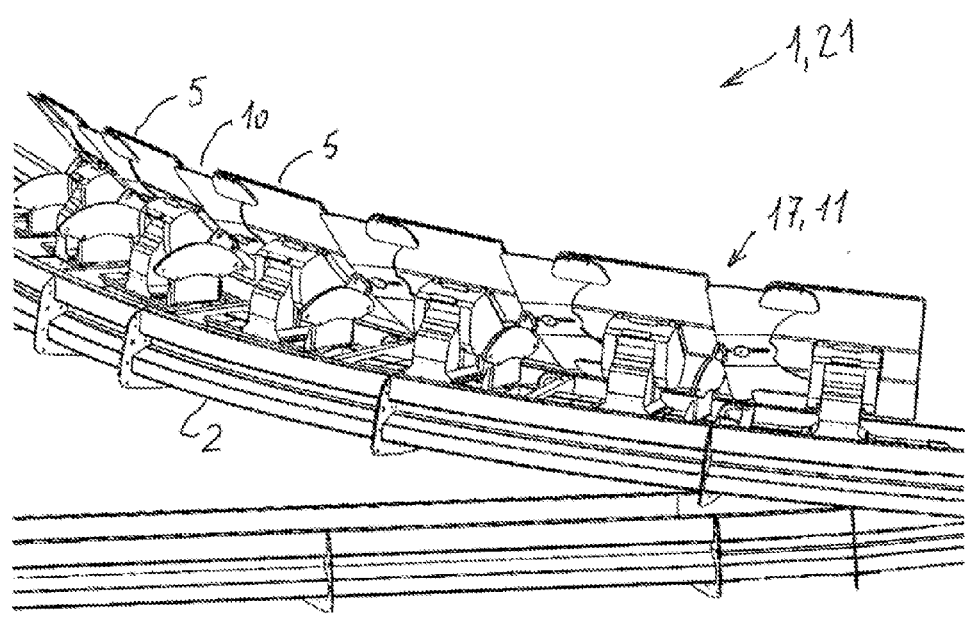
FIG. 37 shows a perspective view of a section of a sorting system with a declined curved track and six carriers, where support structures and cover plates are tilted in the declined curve.

FIGS. 36 and 37 show a sorting system 1 having carriers 21 with support structures 5 and cover plates 10. FIGS. 36 and 37 show the carriers 21 conveyed along a curved and declined track 2. The support structures and cover plates are untilted in FIG. 36 and tilted in FIG. 37.

Figure 38:
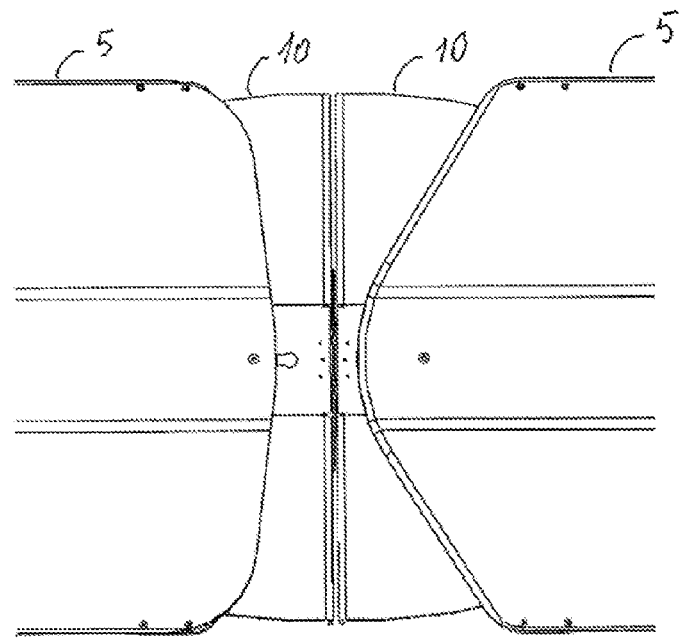
FIG. 38 shows a top view of parts of two adjacent support structures, where two cover plates are facing each other.

FIG. 38 shows a version of the invention, where dual cover plates, leading and guiding systems are covering the gap 15 shown in FIG. 3. Basically, it is two cover plates 10 between two adjacent support structures 5. The cover plates, leading and guiding systems may be similar to what is shown in FIGS. 4 to 37, just times two. A first support structure 5 is connected with a first cover plate 10, which is extending towards an adjacent second support structure 5, where the second adjacent support structure is connected to a second cover plate 10, which is extending towards the first cover plate of the first support structure, in order to substantially close a gap, cf. FIG. 3, between the support structure and an adjacent support structure with the cover plates during operation of a sorting system.

Figure 39:
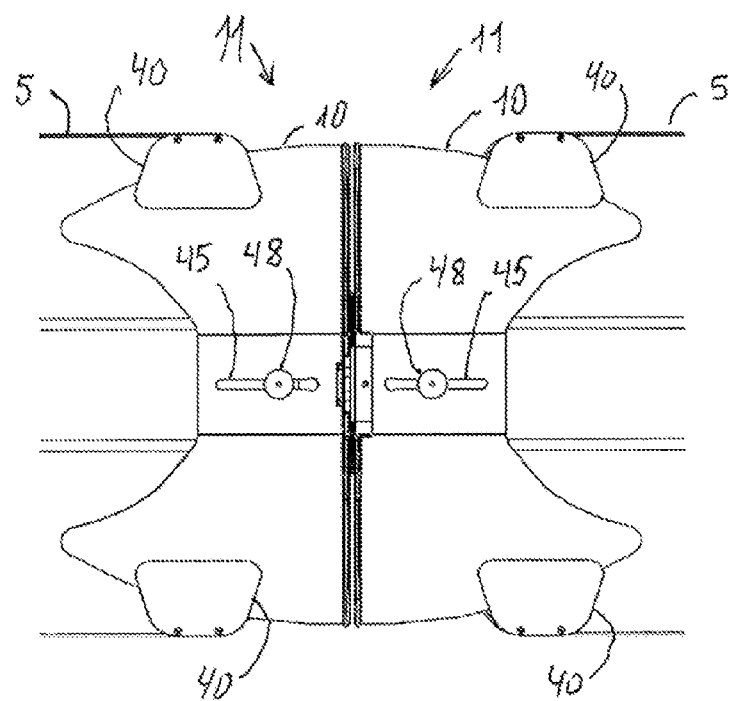
FIG. 39 shows a bottom, sectional view of parts of two adjacent support structures, where two cover plates are facing each other and are each held in place by a leading system.

FIG. 39 shows support structures 5 engaged with cover plates 10. Leading systems 11 including leading elements 40 and holding elements 48 are connected to the support structures to provide receiving recesses for the cover plates. Both cover plates have longitudinal holes 45. Holding elements 48 are connected to the support structures through the longitudinal holes.

Figure 40:
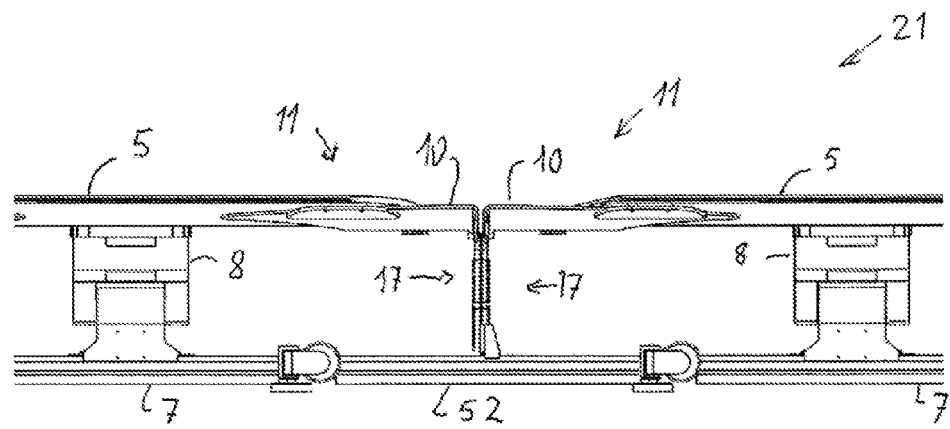
FIG. 40 shows a side view of two carriers having support structures and cover plates extending over an intermediate cart, where the cover plates are held by leading systems on the support structures and guided by guiding systems located with the intermediate cart.

FIG. 40 shows carriers 21 with carts 7 connected by an adjacent, intermediate cart 52. The carts 7 support and convey tilting mechanisms 8, support structures 5 and cover plates 10. Two guiding systems 17 have parts fixated to the adjacent, intermediate cart 52 and other parts connected to their associated cover plates. The leading systems 11 lead the cover plates relative to the support structures.

Figure 41:
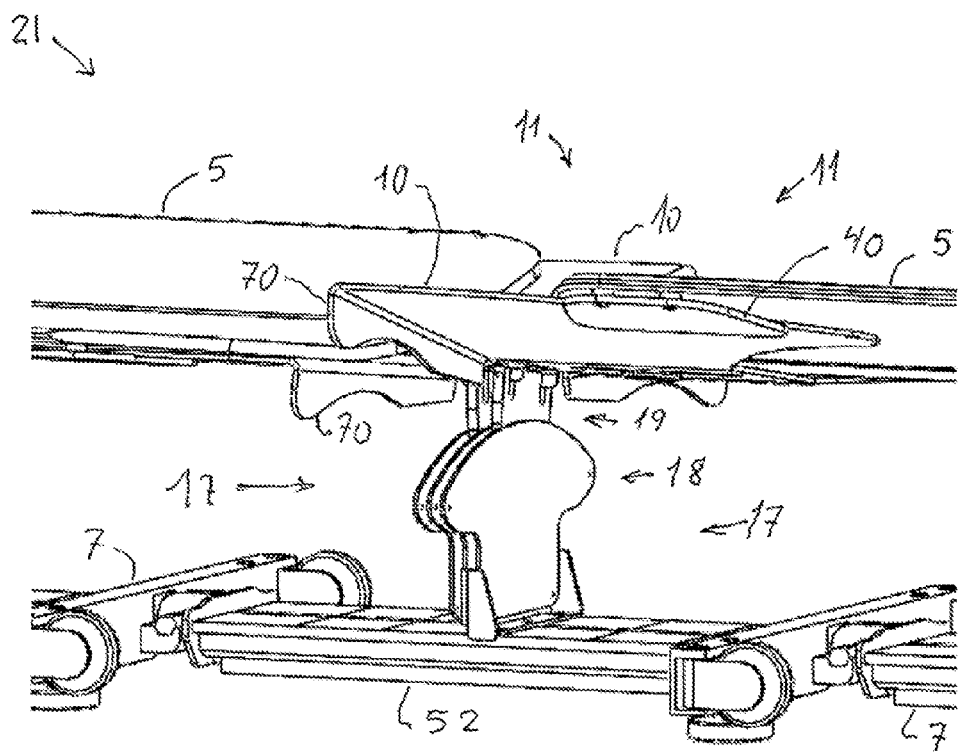
FIG. 41 shows a side view of two carriers in part having support structures and cover plates extending over an intermediate cart, where the cover plates are held by leading systems on the support structures and guided by guiding systems located with the intermediate cart, and where one support structure and its associated cover plate is tilted.

FIG. 41 shows carriers 21 having carts 7 and 52 as well as support structures 5 and cover plates 10. Each cover plate is led and guided by a leading system 11 and a guiding system 17 having a first part 18 fixated to the adjacent, intermediate cart and a second part 19 connected to a cover plate. The support structure and cover plate at the right side are tilted. The cover plates have flanges 70 arranged, so that flanges 70 of both cover plates 10 face each other.

Figure 42:
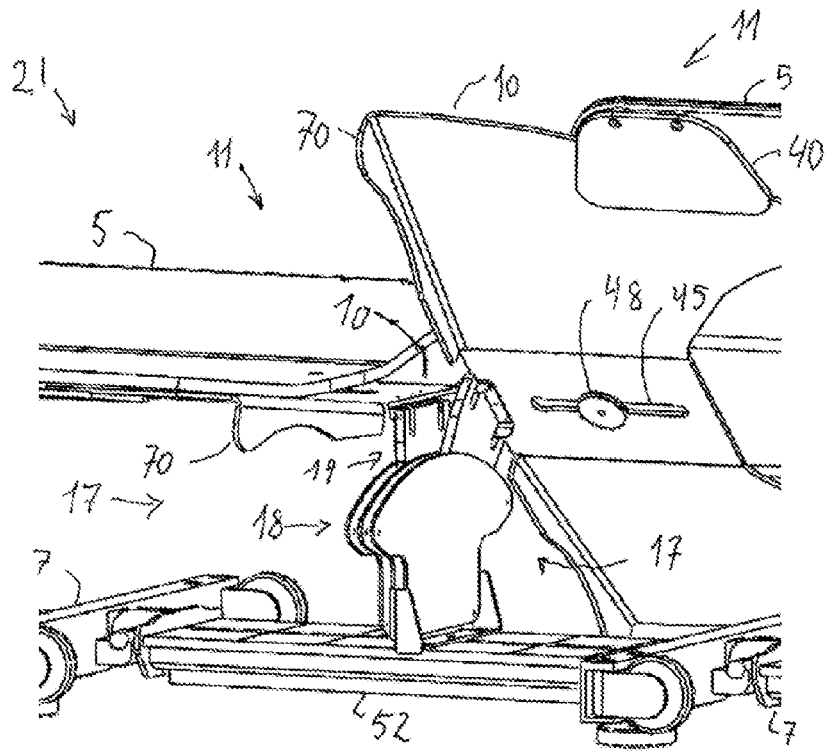
FIG. 42 shows a side view of two carriers in part having support structures and cover plates extending over an intermediate cart, where the cover plates are held by leading systems on the support structures and guided by guiding systems located with the intermediate cart, and where one support structure and its associated cover plate is fully tilted.
Figure 43:
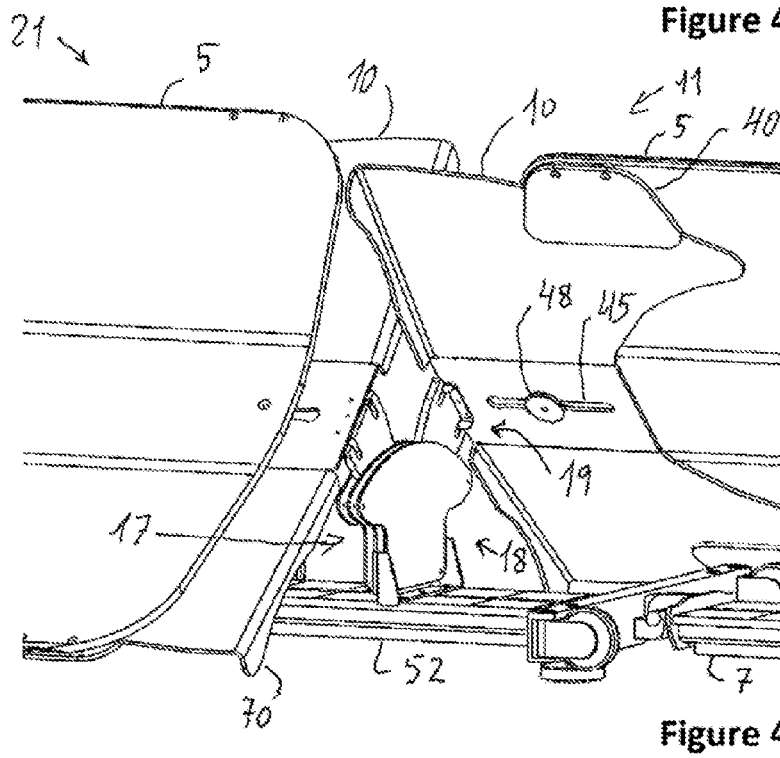
FIG. 43 shows a side view of two carriers in part having support structures and cover plates extending over an intermediate cart, where the cover plates are held by leading systems on the support structures and guided by guiding systems located with the intermediate cart, and where both support structures and their associated cover plates are tilted to opposite sides.

FIGS. 42 and 43 show carriers 21 having carts 7 and 52 as well as support structures 5 and cover plates 10. Each cover plate is guided by a guiding system 17 having a first part 18 fixated to the intermediate cart and a second part 19 connected to a cover plate. The cover plates are led by leading systems 11 having leading elements 40 and holding elements 48, which all are connected to a support structure. The cover plates 10 have a longitudinal hole 45 through which the holding elements are connected to a support structure. In FIG. 42, the right side support structure and cover plate are tilted and the left side support structure and cover plate are untilted. In FIG. 43, the support structure and cover plate to the right are tilted to one side and the left side support structure and cover plate are tilted oppositely. Again, the support structures and cover plates may be tilted, oppositely tilted or untilted independently.

Figure 44:
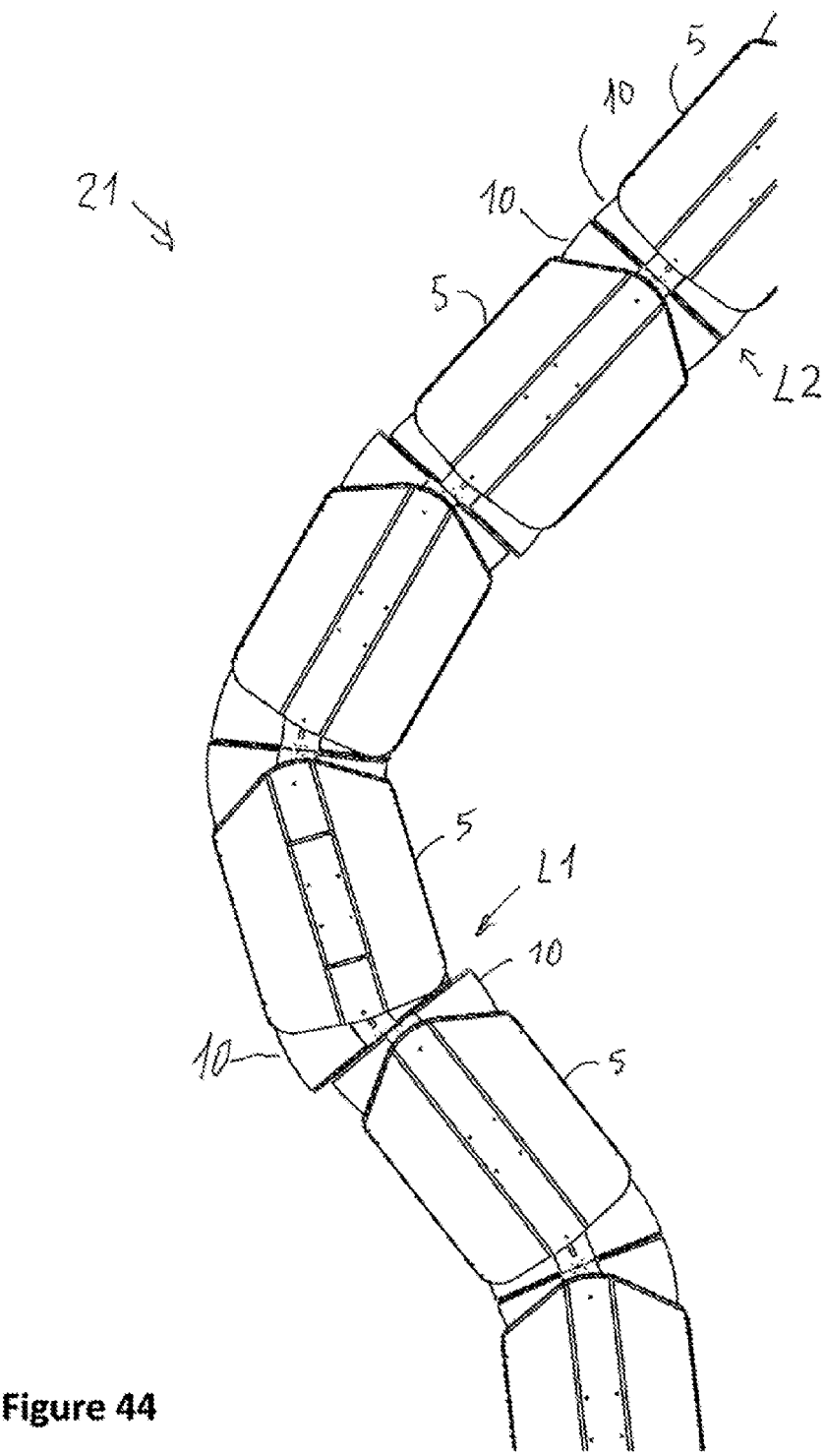
FIG. 44 shows a top view of a number of carriers with support structures having cover plates at each end, such that two cover plates are located between adjacent support structures, where the support structures and cover plates pass a horizontal curve untilted, and where relative movement of the cover plates are shown at locations in the curve.

FIG. 44 shows a number of carriers 21 with support structures 5 and cover plates 10. The carriers are conveyed untilted through a non-shown horizontal track curve section and a horizontal straight track section. At location L1 in a non-shown curve, the cover plates 10 are displaced relative to each other between adjacent support structures in a horizontal direction. At location L2 of a non-shown straight section of a track, the cover plates 10 are centered relative to each other.

Figure 45:
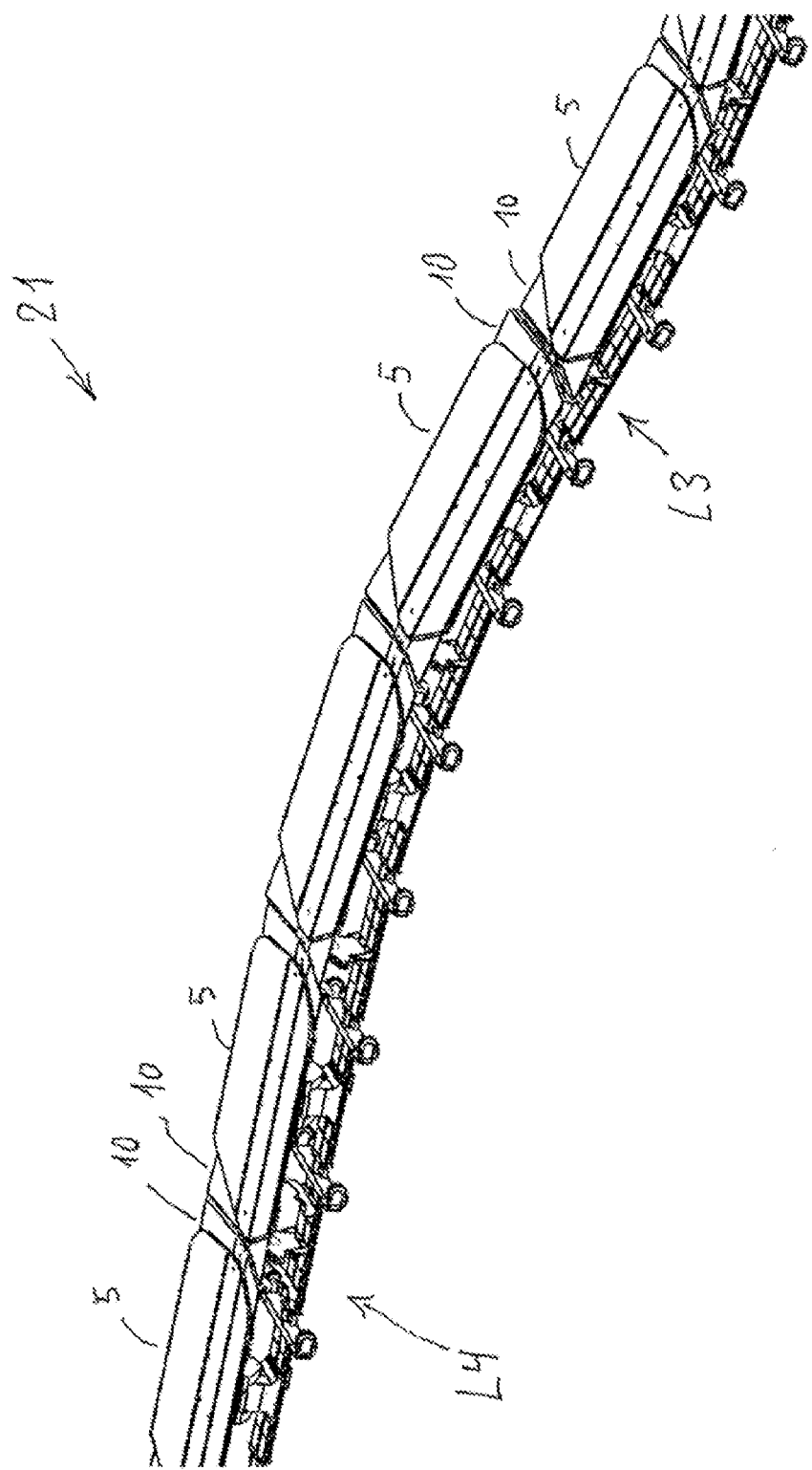
FIG. 45 shows a number of carriers with support structures having cover plates at each end, such that two cover plates are located between adjacent support structures, where the support structures and cover plates are shown coming from a horizontal straight situation untilted, coming through a transition to an inclined situation and onwards to a horizontal straight situation. Also shown, is relative displacement of cover plates at different locations.

FIG. 45 shows carriers 21 as conveyed in a non-shown inclined and straight section of a track. Cover plates 10 close gaps 15, cf. FIG. 3, between adjacent support structures. In location L3 the cover plates 10 are displaced slightly in a vertical direction. In location L4 the cover plates are levelled.

Figure 46:
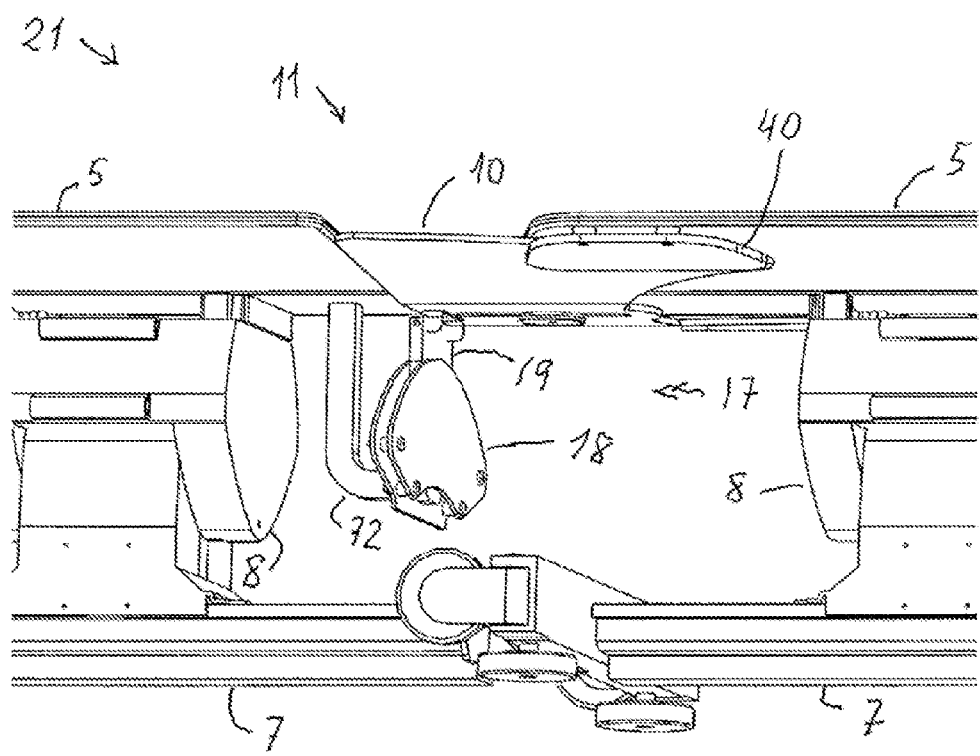
FIG. 46 is a perspective view of carriers, where one carrier has a leading system, and where a guiding system is arranged between a cover plate associated with a support structure and an adjacent support structure located on an adjacent cart.

FIG. 46 show carriers 21 having support structures 5. A cover plate 10 is arranged between the support structures. The cover plate is led by a leading system 11 having a leading element 40. One part 18 of a guiding system 17 is fixated indirectly to an adjacent cart via an adjacent support structure 5 by an arm 72. Another part 19 of the guiding system is connected to the cover plate. Although not shown, the arm 72 could also be connected to the tilting mechanism 8 and also thereby be indirectly connected to the adjacent cart.

In relation to FIGS. 47-52, it is hereby disclosed that is a known problem of conveyor systems comprising separate support structures 5, that parts of the load that is transported by the conveyor system may get wedged between separate surfaces of the system, such as support structures 5 and/or cover plates 10. This may e.g. happen when the support structures enter or leave curved track sections, when the load is loaded onto the support structure 5, when the structures are tilted so as to discharge their load, or when the support structures 5 are returned from their tilted position to their horizontal position.

Any minor remaining gap between separate parts may not always be an issue. Though, in particular, when conveying loads such as items 110 illustrated in FIG. 52, with loosely hanging parts, such as baggage straps or baggage handles 112 there is a risk, that at least a portion of the load, such as a portion of the handles 112, may be wedged or caught in any such minor gap. This is unwanted, and may e.g. prevent the item from being correctly loaded or unloaded and may e.g. potentially cause a stop in the operation of the system.

Figure 47:
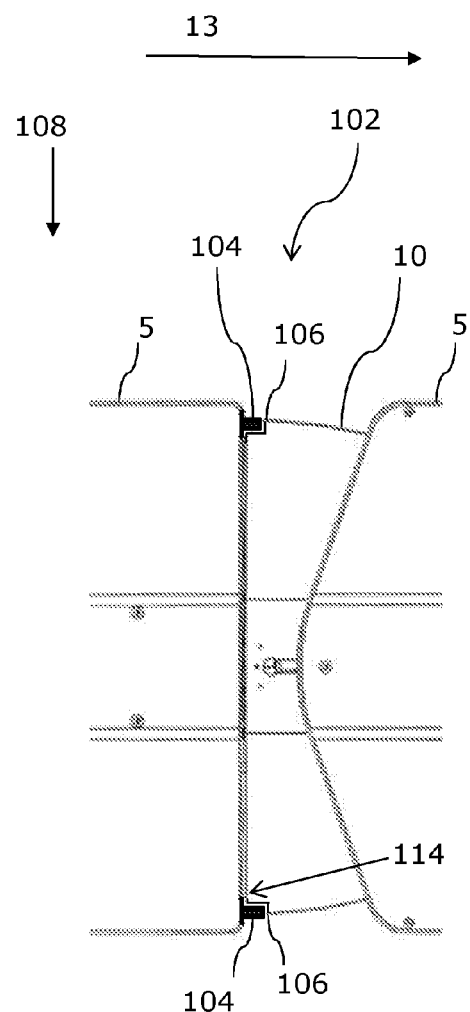
FIGS. 47-52 illustrate further embodiments of the invention.

FIG. 47 is a top view and shows a system 102 to reduce this risk or even completely prevent this from occurring. From the figure, it follows that there are two support structures 5. A cover plate 10 is arranged with the support structure 5 shown to the left. The cover plate extends towards an adjacent support structure 5 shown to the right. During movement of the support structures 5 in a track of the system generally along the conveying direction 13, and especially when tilting one of the support structures 5, the cover plate 10 and the support structure 5 to the left moves relatively to each other.

Thus, one of the parts of the conveyor system can and will move relatively to the other. In this example, the cover plate 10 and the support structure 5 can move relatively to the each other. It follows from the figure, that one of the parts, here the support structure 5, includes a protruding member 104, and that the other part includes a carved out form or opening 106 or indentation 106, which is operably formed to cooperate with the protrusion. This is provided for preventing a portion of the load to be caught or wedged between the cover plate 10 and the support structure 5, e.g. upon loading the load onto the support structure 5.

Figure 51:
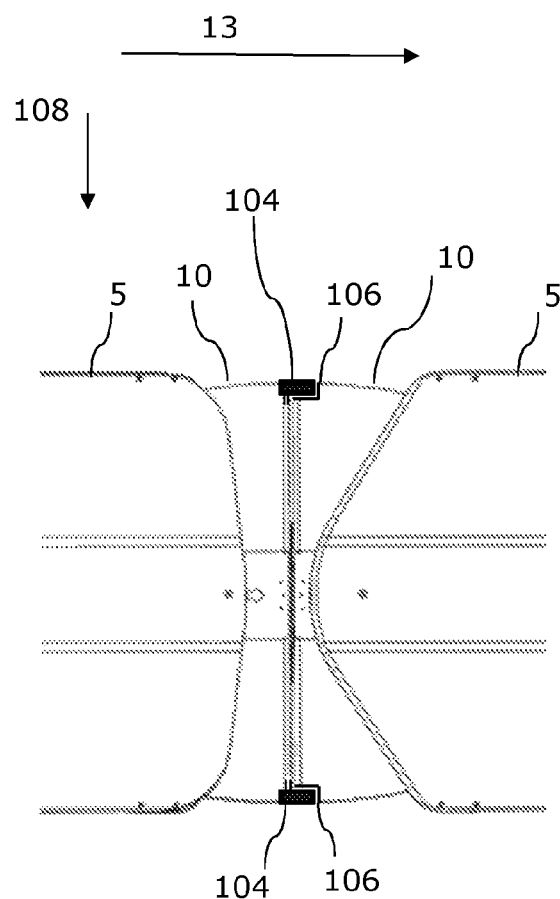
Figure 52:
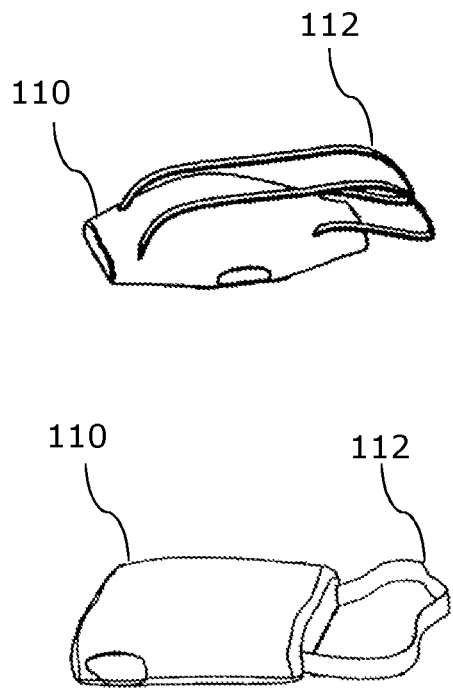

It follows from FIG. 51 that a system based on the same solution may alternatively, and as an example, be provided between two cover plates 10, where each cover plate is operably connected to its respective load support structure 5.

Loading may take place in a direction comprising a vector in a direction as illustrated with the arrow 108, and i.e. horizontal or substantially horizontal and transverse to the conveying direction 13.

The protruding member 104 extends past an end of the adjacent part so as to close the gap when seen in the direction 108 or opposite to the direction 108. This is provided to prevent a loosely hanging handle 112, see FIG. 6 of being caught or wedged in any minor remaining gap 114 between the two parts that can move and/or tilt relatively to each other. Hereby the portion of the load, such as the handle is prevented from getting into the gap.

The protruding member 104 is preferably flexible. This flexibility is provided so as to be flexible to relative movement between the parts between which parts the gap is to be closed or is at least to become less accessible. Further, when given certain flexibility, the protruding member can have the wanted effect, but will in itself be too flexible to work as an unwanted hook.

Figure 48:
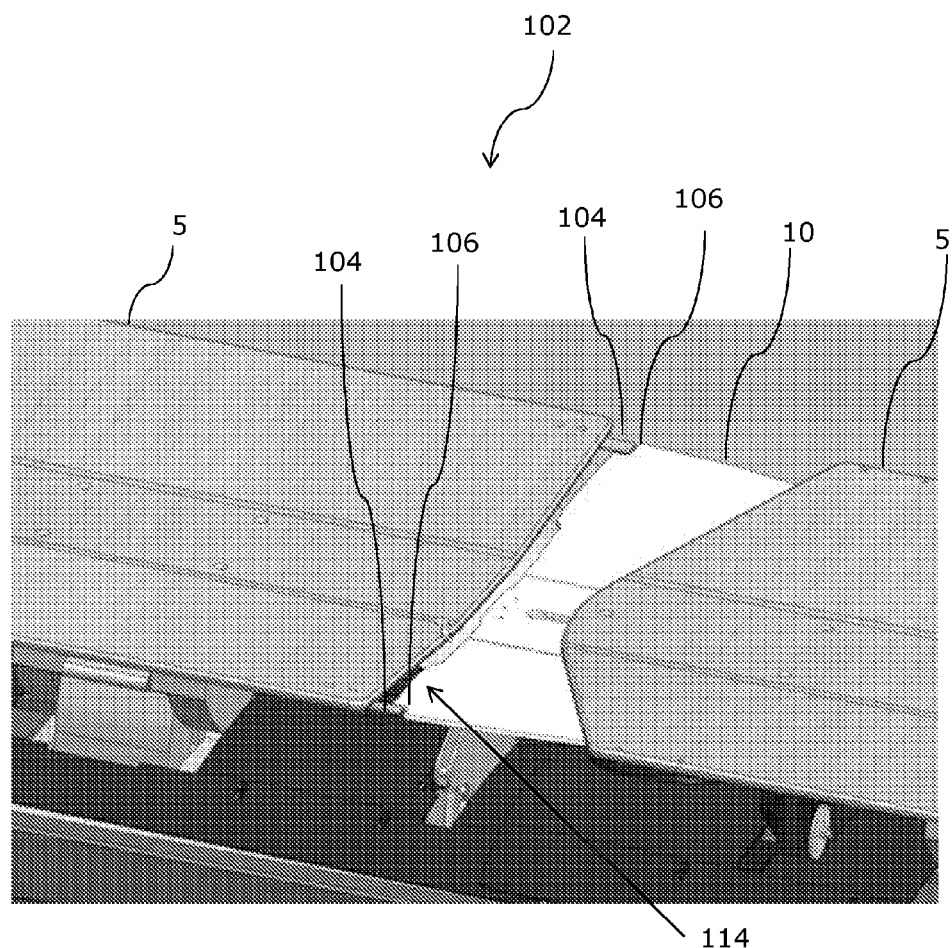

FIG. 48 is a perspective view from an angle where the minor gap 114 is seen and possibly somewhat enlarged for illustrative purposes.

Figure 49:
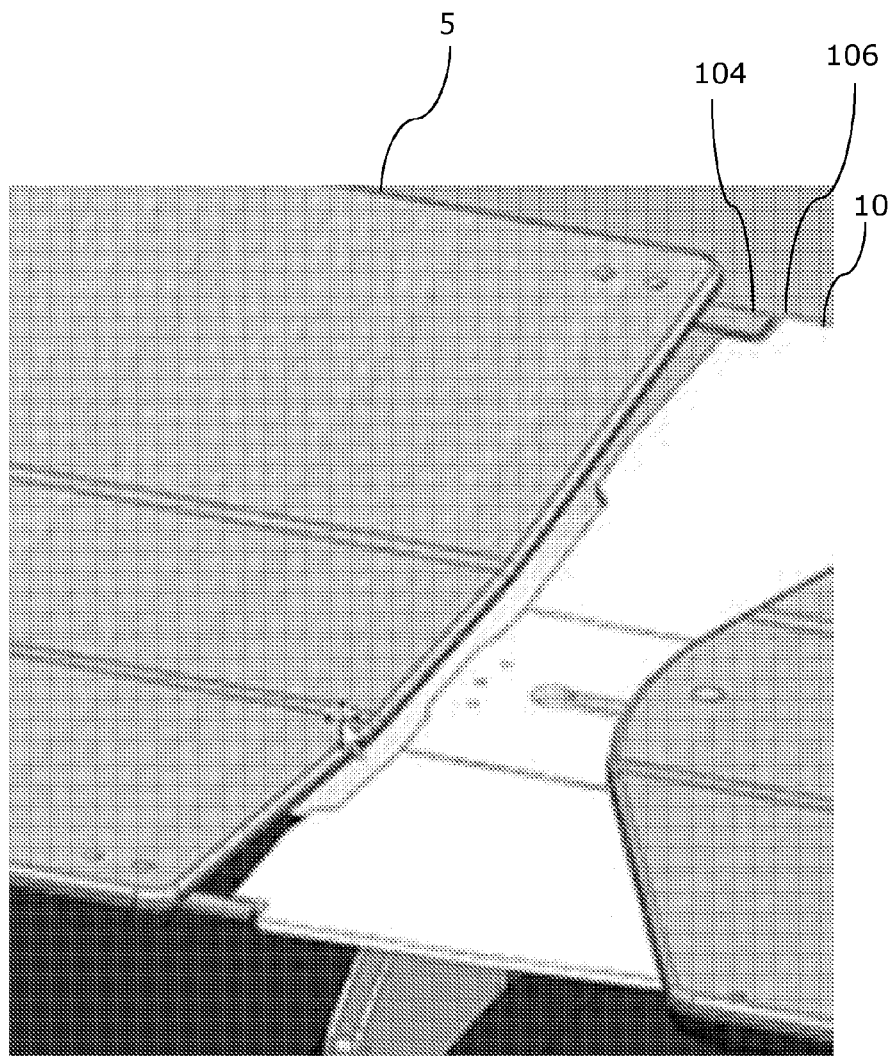

FIG. 49 is a close up of the illustration of FIG. 48.

Figure 50:
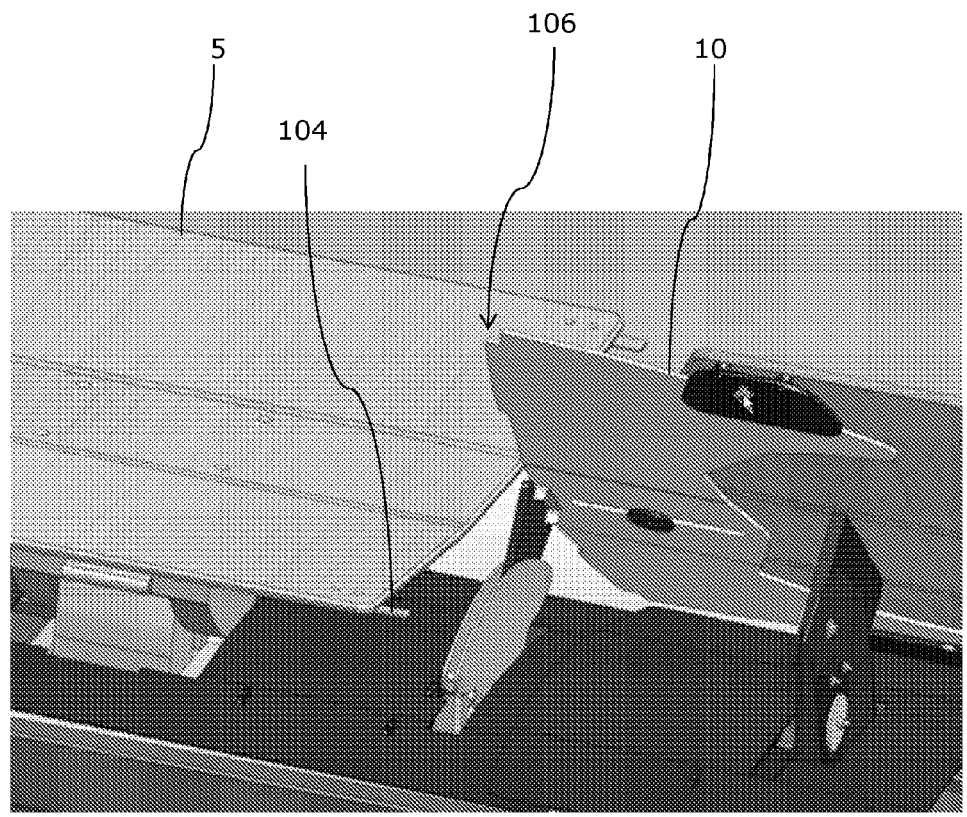

FIG. 50 is the system shown in FIGS. 47-49 when one of the opposing support structures 5, to the right, and with the cover plate 10, is tilted relatively to the support structure 5 to the left. The illustration shows the protrusion 104 connected at or towards a corner of the support structure 5 and shows the corresponding indentation 106 of the adjacent cover plate 10.

As described above, it is shown in FIG. 51 that a system based on the disclosed solution may be provided between two cover plates 10, where each cover plate is operably connected to its respective load support structure 5.

In the embodiments disclosed in FIGS. 47-52, one protrusion 104 and one corresponding form 106 in the adjacent part are illustrated and used at or towards each side of the parts. However, one or more further protrusions and corresponding indentations or forms corresponding to the protrusion may be provided along the width of the support structures and/or the cover plates as found appropriate.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. Sorting system comprising
   a track having horizontally straight sections and horizontally curved sections,
   a plurality of non-tiltable or tiltable load support structures, a plurality of linked conveying carts adapted to support and convey the support structures along the track in a conveying direction,
   a cover plate arranged with a support structure so as to substantially close a gap between the support structure and an adjacent support structure,
   where the sorting system comprises a leading system configured to
      connect the cover plate to the support structure, for the support structure to carry the cover plate and any item located at least partly on the cover plate,
      and allow rotation of the cover plate relative to the support structure about an axis, which axis is vertical, when the cover plate is untilted and in a horizontal section of the track,
      and allow motion of the cover plate relative to the support structure back and forth in the conveying direction,
      and substantially center the cover plate relative to the adjacent support structure, when the cover plate and the adjacent support structure are in a horizontal straight section of the track,
   where the sorting system comprises a guiding system comprising a first and a second part,
      where one part of the first and second parts is connected to the cover plate,
      and the other part of the first and second parts is fixated directly or indirectly to an adjacent cart, which adjacent cart is located in a direction, in which direction the cover plate and the adjacent support structure are located, and wherein fixated indirectly includes that the other part of the first and second parts of the guiding system is fixated to any element located on the adjacent cart, including to a non-tilting support structure, a support for a non-tilting support structure, a tilting mechanism or a tiltable support structure,
      and where the first and second parts of the guiding system constrain the cover plate from moving back and forth in the conveying direction relative to the first and second parts of the guiding system, and where the first and second parts of the guiding system are movably arranged relative to each other in a plane, which plane is vertical and transverse to the conveying direction, when the cover plate is in a horizontal straight section of the track, wherein the motion of the cover plate is led and guided by the leading system and the guiding system, in order to substantially close a gap between the support structure and an adjacent support structure with the cover plate during operation of the sorting system, wherein the support structure is concave in a direction, which direction is horizontal and transverse to the conveying direction, when the support structure is conveyed untilted in a horizontal straight section of the track and wherein the leading system comprises a leading and/or holding element, which leading and/or holding element provides a recess adapted for supporting and leading the cover plate underneath the support structure and is shaped according to the concave support structure.

2. Sorting system according to claim 1, wherein the sorting system is of a tiltable support structure type, which comprises a plurality of linked conveying carts adapted to support and convey the support structures along the track in a conveying direction as well as tilt the support structures, where the sorting system comprises a leading system configured to connect the cover plate to the support structure, for the cover plate and the support structure to be tilted together.

3. Sorting system according to claim 1, wherein the guiding system comprises that one part is connected to the cover plate by being an integrated part of the cover plate.

4. Sorting system according to claim 1, wherein the guiding system comprises that one part of the first and second parts of the guiding system is pivotably connected by at least one hinge or bendably connected by at least one deformable element to the cover plate in order to allow rotation or bending of the cover plate as a whole about an axis, which axis is horizontal and transverse to the conveying direction, when the cover plate is untilted and in a straight horizontal section of the track.

5. Sorting system according to claim 1, wherein the first and second parts of the guiding system are engaged with each other to constrain the cover plate from moving back and forth in the conveying direction, and wherein one of the parts extends so widely in plane, which plane is vertical and transverse to the conveying direction, when the cover plate is in a horizontal straight section of the track, in order that the other part may move and rotate relative to the one part in that plane.

6. Sorting system according to claim 1, wherein the support structure and the cover plate are conveyed in sections of a track having sections selected from a group comprising inclined straights sections, declined straight sections, inclined curved sections and declined curved sections, including transitions between such sections of the track, while the support structures and cover plates are tilted or untilted.

7. Sorting system according to claim 1, wherein the track is horizontal and comprises straight and curved sections, and wherein one part of the first and second parts of the guiding system is fixated to the cover plate and the other part is fixated directly or indirectly to an adjacent cart, and where the support structures are untilted at least in curved sections.

8. Sorting system according to claim 3, wherein the guiding system comprises a first part having two parallel plates and a second part being an upright, which has a thickness corresponding to a distance between the two plates.

9. Sorting system according to claim 3, wherein the guiding system comprises a first part having two uprights, each having one plane side, and a second part being a plate with a cut-out, where a pin through the cut-out from the upright is connected to the other upright, where the plane sides of the uprights are facing each other and have a distance between them corresponding to a wall thickness of the plate.

10. Sorting system according to claim 1, wherein the leading system comprises a leading element and/or a holding element providing a recess adapted for supporting and leading the cover plate underneath the support structure.

11. Sorting system according to claim 1, wherein the cover plate is made of polymeric material, including made of polypropylene (PP).

12. Sorting system according to claim 1, wherein the leading system comprises an element made of polymeric material, including made of polyoxymethylene (POM).

13. Sorting system according to claim 1, wherein the cover plate is bent to fit into at least one recess provided by the leading element.

14. Sorting system according to claim 1, wherein the cover plate comprises a longitudinal hole, which is parallel to the conveying direction, when conveyed in a straight section of the track.

15. Sorting system according to claim 14, wherein the longitudinal hole in the cover plate is arranged in line with a center part of the adjacent support structure.

16. Sorting system according claim 14, wherein the leading system comprises that the holding element is connected to the support structure through the longitudinal hole in the cover plate by at least one fastening means.

17. Sorting system according to claim 14, wherein the leading system comprises leading elements and a leading pin, which leading pin is connected to the support structure and is extending from the support structure through the longitudinal hole in the cover plate, and where the leading pin has a width corresponding to a width of the longitudinal hole.

18. Sorting system according to claim 1, wherein a first support structure is connected with a first cover plate, which is led and guided by a leading system and a guiding system, and is extending towards an adjacent second support structure, where the second adjacent support structure is connected to a second cover plate, which is led and guided by a leading system and a guiding system, and is extending towards the first cover plate of the first support structure, in order to substantially close a gap between the support structure and an adjacent support structure with the cover plates during operation of the sorting system.

19. Kit for a support structure sorting system, wherein the kit comprises:
a cover plate,
a leading system adapted to, when installed on a sorting system,
connect the cover plate to a tiltable or non-tiltable support structure, and for the support structure to carry the cover plate and any item located at least partly on the cover plate,
and allow rotation of the cover plate relative to the support structure about an axis, which is vertical, when the cover plate is untilted, and in a horizontal straight section of the track, and allow motion of the cover plate relative to the support structure back and forth in the conveying direction, and substantially center the cover plate relative to an adjacent support structure of the sorting system, when the cover plate and adjacent support structure are untilted and are in a horizontal straight section of a track of the sorting system, a guiding system, which when installed on a sorting system, comprises:

a first and a second part, where one part of the first and second parts is connected to the cover plate, and the other part of the first and second parts is fixated directly or indirectly to an adjacent cart, which adjacent cart is located in a direction, in which direction the cover plate and the adjacent support structure are located, and wherein fixated indirectly includes that the other part of the first and second parts of the guiding system is fixated to any element located on the adjacent cart, including to a non-tilting support structure, a support for a non-tilting support structure, a tilting mechanism or a tiltable support structure, and where the first and second parts of the guiding system constrain the cover plate from moving back and forth in the conveying direction relative to the first and second parts of the guiding system, and where the first and second parts of the guiding system are movably arranged relative to each other in a plane, which plane is vertical transverse to the conveying direction, when the cover plate is in a horizontal straight section of the track, in order to substantially close a gap between the support structure and an adjacent support structure with the cover plate during operation of the sorting system, wherein the support structure is concave in a direction, which direction is horizontal and transverse to the conveying direction, when the support structure is conveyed untilted in a horizontal straight section of the track and wherein the leading system comprises a leading and/or holding element, which leading and/or holding element provides a recess adapted for supporting and leading the cover plate underneath the support structure and is shaped according to the concave support structure.

20. Kit according to claim 19, wherein the sorting system is of a tilt support structure type, which comprises a plurality of linked conveying carts adapted to support and convey the support structures along the track in a conveying direction as well as tilt the support structures, where the kit, when installed on a sorting system, comprises a leading system configured to connect the cover plate to the support structure, for the cover plate and the support structure to be tilted together.

21. Kit according to claim 19, wherein the kit, when installed on a sorting system, comprises that the guiding system has one part, which part is connected to the cover plate by being an integrated part of the cover plate.

22. Kit according to claim 19, wherein the kit comprises a guiding system, where at least one part of the first and second parts of the guiding system, when installed, is pivotably connected or bendably connected to the cover plate in order to allow rotation or bending of the cover plate as a whole about an axis, which is horizontal and transverse to the conveying direction, when the cover plate is untilted and in a horizontal and straight section of a track.

23. Kit according to claim 19, wherein, when installed on a tilt support structure sorting system, a first support structure is connected with a first cover plate, which is led and guided by a leading system and a guiding system, and is extending towards an adjacent second support structure, where the second adjacent support structure is connected to a second cover plate, which is led and guided by a leading system and a guiding system, and is extending towards the first cover plate of the first support structure, in order to substantially close a gap between the support structure and an adjacent support structure with the cover plates during operation of the sorting system.

24. Method of providing a support structure sorting system having a gap substantially closed between at least two support structures, the sorting system comprising a track having horizontally straight sections and horizontally curved sections, a plurality of non-tiltable or tiltable load support structures, a plurality of linked conveying carts adapted to support and convey the support structures along the track in a conveying direction, and the method comprises providing a cover plate arranged with a support structure so as to substantially close a gap between the support structure and an adjacent support structure, and providing a leading system configured to connect the cover plate to the support structure and for the support structure to carry the cover plate and any item located at least partly on the cover plate, and allow rotation of the cover plate relative to the support structure about an axis, which is vertical, when the cover plate is untilted and in a horizontal straight section of the track, and allow motion of the cover plate relative to the support structure back and forth in the conveying direction, and substantially center the cover plate relative to the adjacent support structure, when the cover plate and the adjacent support structure are in a horizontal straight section of the track, and providing a guiding system comprising a first and a second part, where one part of the first and second parts is connected to the cover plate, and the other part of the first and second parts is fixated directly or indirectly to an adjacent cart, which adjacent cart is located in a direction, in which direction the cover plate and the adjacent support structure are located, and wherein fixated indirectly includes that the other part of the first and second parts of the guiding system is fixated to any element located on the adjacent cart, including to a non-tilting support structure, a support for a non-tilting support structure, a tilting mechanism or a tiltable support structure, and where the first and second parts of the guiding system constrain the cover plate from moving back and forth in the conveying direction relative to the first and second parts of the guiding system, and where the first and second parts of the guiding system are movably arranged relative to each other in a plane, which plane is vertical and transverse to the conveying direction, when the cover plate is in a horizontal straight section of the track, and wherein the method comprises that the motion of the cover plate is led and guided by the leading system and the guiding system, wherein the support structure is concave in a direction, which direction is horizontal and transverse to the conveying direction, when the support structure is conveyed untilted in a horizontal straight section of the track and wherein the leading system comprises a leading and/or holding element, which leading and/or holding element provides a recess adapted for supporting and leading the cover plate underneath the support structure and is shaped according to the concave support structure.

25. Method according to claim 24, wherein the sorting system is of a tiltable support structure type, which comprises a plurality of linked conveying carts adapted to support and convey the support structures along the track in a conveying direction as well as tilt the support structures, wherein the sorting system comprises a leading system configured to connect the cover plate to the support structure, for the cover plate and the support structure to be tilted together.

26. Method according to claim 24, wherein the guiding system comprises that one part is connected to the cover plate by being an integrated part of the cover plate.

27. Method according to claim 24, wherein the method comprises that one part of the first and second parts of the guiding system is connected pivotably or bendably to the cover plate in order to allow rotation or bending of the cover plate as a whole about an axis, which is horizontal and transverse to the conveying direction, when the cover plate is untilted and in a horizontal straight section of the track.

28. Method according to claim 24, wherein the support structure and the cover plate are conveyed in sections of a track comprising sections of a group selected from inclined straight sections, declined straight sections, inclined curved sections and declined curved sections, including transitions between such sections of the track, while the support structures and cover plates are tilted or untilted.

29. Method according to claim 24, wherein the track is horizontal and comprises straight and curved sections, and wherein one part of the first and second parts of the guiding system is fixated to the cover plate and the other part of the first and second parts is fixated directly or indirectly to an adjacent cart, which adjacent cart is located in a direction, in which direction the cover plate and the adjacent support structure are located, and wherein fixated indirectly includes that the other part of the first and second parts of the guiding system is fixated to any element located on the adjacent cart, including to a non-tilting support structure, a support for a non-tilting support structure, a tilting mechanism or a tiltable support structure.

30. Method according to claim 24, wherein the method includes a first support structure is connected with a first cover plate, which is led and guided by a leading system and a guiding system, and is extending towards an adjacent second support structure, where the second adjacent support structure is connected to a second cover plate, which is led and guided by a leading system and a guiding system, and is extending towards the first cover plate of the first support structure, in order to substantially close a gap between the support structure and an adjacent support structure with the cover plates during operation of the sorting system.

* * * * *